US011959442B2

(12) United States Patent
Walser et al.

(10) Patent No.: US 11,959,442 B2
(45) Date of Patent: Apr. 16, 2024

(54) LOW-PRESSURE EGR SYSTEM WITH CONDENSATE MANAGEMENT

(71) Applicant: EControls, LLC, San Antonio, TX (US)

(72) Inventors: Michael Walser, Comfort, TX (US); Steve Dent, Seguin, TX (US)

(73) Assignee: EControls, LLC, San Antonio, TX (US)

( * ) Notice: Subject to any disclaimer, the term of this patent is extended or adjusted under 35 U.S.C. 154(b) by 0 days.

(21) Appl. No.: 18/252,591

(22) PCT Filed: Dec. 16, 2021

(86) PCT No.: PCT/US2021/063777
§ 371 (c)(1),
(2) Date: May 11, 2023

(87) PCT Pub. No.: WO2022/133072
PCT Pub. Date: Jun. 23, 2022

(65) Prior Publication Data

US 2024/0003318 A1 Jan. 4, 2024

Related U.S. Application Data

(60) Provisional application No. 63/126,017, filed on Dec. 16, 2020.

(51) Int. Cl.

| | |
|---|---|
| ***F02M 26/01*** | (2016.01) |
| ***F02M 26/24*** | (2016.01) |
| ***F02M 26/30*** | (2016.01) |

(52) U.S. Cl.
CPC ............ *F02M 26/01* (2016.02); *F02M 26/24* (2016.02); *F02M 26/30* (2016.02)

(58) Field of Classification Search
CPC ......... F02M 26/01; F02M 26/24; F02M 26/30
See application file for complete search history.

(56) References Cited

U.S. PATENT DOCUMENTS 4,005,689 A 2/1977 Barnard
4,359,989 A 11/1982 Masaki et al.
(Continued)

FOREIGN PATENT DOCUMENTS

KR 20190007203 A 1/2019

*Primary Examiner* — Jesse S Bogue
(74) *Attorney, Agent, or Firm* — William H. Quirk; Alexander J. Antonio; Rosenthal Pauerstein Sandoloski Agather, LLP.

(57) ABSTRACT

An exhaust gas recirculation (EGR) system for an internal combustion (IC) engine. The EGR system has a first cooler configured to cool exhaust from an exhaust system of the IC and to drain exhaust liquid formed by the cooling. The EGR system has a mixture chamber configured to mix exhaust cooled by the first cooler with intake air to form an exhaust-air mixture. The EGR system has a second cooler configured to cool the exhaust-air mixture. The EGR system has a heat exchange system for circulating and cooling coolant fluid used by the first and second coolers, and includes a split valve configured to divide coolant fluid flow between the first and second coolers. The EGR system has an engine control module configured to adjust the split valve based on comparing a temperature of the exhaust-air mixture to a determined dewpoint temperature of the exhaust-air mixture.

15 Claims, 10 Drawing Sheets

(56) References Cited

U.S. PATENT DOCUMENTS

| | | | | |
|---|---|---|---|---|
| 7,650,753 | B2 * | 1/2010 | Muller | F02B 29/0493 123/41.31 |
| 8,230,843 | B2 | 7/2012 | Kurtz | |
| 8,602,007 | B2 * | 12/2013 | Wu | F02B 29/0443 701/108 |
| 10,119,484 | B2 * | 11/2018 | Park | F02M 26/06 |
| 10,138,800 | B2 | 11/2018 | LaPointe et al. | |
| 10,393,039 | B2 * | 8/2019 | Ulrey | F01N 13/107 |
| 10,578,058 | B2 * | 3/2020 | Kim | F02D 21/08 |
| 11,125,190 | B2 * | 9/2021 | Kuske | F02M 26/33 |
| 2002/0139360 | A1 | 10/2002 | Sato et al. | |
| 2010/0313863 | A1 | 12/2010 | Yoshikawa et al. | |
| 2011/0041814 | A1 | 2/2011 | Kardos et al. | |
| 2014/0150758 | A1 | 6/2014 | Zurlo et al. | |
| 2015/0354512 | A1 | 12/2015 | Tsujii | |
| 2016/0319779 | A1 * | 11/2016 | LaPointe | F01N 3/101 |
| 2017/0022940 | A1 * | 1/2017 | Minami | F02D 23/00 |
| 2017/0306898 | A1 * | 10/2017 | Kim | F02D 23/00 |
| 2018/0100471 | A1 * | 4/2018 | Minami | F02B 29/0493 |
| 2019/0234287 | A1 | 8/2019 | Amann | |
| 2020/0157989 | A1 * | 5/2020 | Patil | F02B 29/0493 |

* cited by examiner

LOW-PRESSURE EGR SYSTEM WITH CONDENSATE MANAGEMENT

CROSS-REFERENCE TO RELATED APPLICATION

This application claims the benefit of the filing date of U.S. Provisional Application Ser. No. 63/126,017, filed on Dec. 16, 2020, entitled "Low Pressure EGR System with Condensate Management", as well as the entire disclosure of which is hereby incorporated by reference in the present disclosure.

BACKGROUND

1. Field

The present disclosure relates to exhaust gas recirculation (EGR) systems for use in natural gas-powered internal combustion (NGIC) engines, and more particularly to the management of the efficiency and effectiveness of such systems in low-pressure EGR systems for such NGIC engines.

2. Description of Related Art

As vehicle nitrogen oxide ("NOx") emission levels are becoming an increasing concern, many countries are introducing regulations to curb the effects of NOx emissions on the environment. China, for example, is developing stricter regulations to address increasing vehicle NOx emissions to mitigate associated health and environmental problems. Exhaust gas from internal combustion ("IC") engines contains NOx, which form as a result of excess nitrogen and oxygen at high temperatures during combustion. $NO_x$ emissions are poisonous and can negatively impact the environment.

Exhaust gas recirculation ("EGR") systems have long been used to help reduce NOx emissions while also managing the efficiency and effectiveness of IC engine systems. EGR systems recirculate a portion of exhaust gas back into the combustion chamber of IC engines. EGR systems typically comprise a passageway to effectively route a small portion of exhaust gas to be recirculated with intake air, a cooler ("EGR cooler") to lower the temperature of the recirculated exhaust gas, and a valve ("EGR valve") to control flow at the recirculation point.

Categorized into high-pressure and low-pressure EGR systems, high pressure EGR systems being the most common, low pressure EGR systems operate at a lower temperature than their high-pressure counterpart and can be more efficient at reducing NOx emissions. One major distinction in the architecture of low-pressure EGR systems is the point at which the exhaust gas is extracted and recirculated with the intake air.

EGR systems are frequently coupled with a turbocharger and a charge air cooler ("intercooler"). After the recirculated exhaust gas is mixed with intake air, the resulting mixture is compressed at the compressor side ("compressor") of the turbocharger and then passes through the intercooler before being further mixed with fuel. The combination of the compressor and the intercooler contribute to a higher oxygen content in the air-exhaust gas mixture, which further contributes to a more complete combustion in the combustion chamber. The turbine side ("turbine") of the turbocharger receives exhaust gas from the exhaust manifold and is driven by positive pressure at this point in the system. A shaft, being shared by the both the compressor and the turbine, rotates, which enables the compressor to operate while the turbine is activated. To explain further, the turbocharger comprises two wheels, one for the compressor and one for the turbine, each wheel being coupled to a shaft. As the turbine wheel spins, the compressor wheel spins, thereby allowing suction at the compressor inlet. In turbocharged IC engine systems equipped with a low pressure EGR system, exhaust gas extraction takes place downstream from the turbocharger turbine, recirculation taking place upstream to the turbocharger compressor; as opposed to extraction taking place upstream to the turbine and recirculation downstream from the compressor, seen in typical high pressure EGR systems.

A common problem with EGR systems is the amount of condensation produced from cooling the recirculated exhaust gas. When mixed with fresh charge fuel, the recirculated exhaust gas, being rich with nitrous oxides ("NOx"), provides an excess of oxygen ("O2"), enabling a more complete combustion reaction in the IC engine's combustion chamber. As a result of using an EGR system, the exhaust gas being expelled into the atmosphere contains less NOx as well as an increase of O2 and water ("H2O") levels.

When low-pressure EGR systems are used in turbocharger equipped NGIC engine systems, significant amounts of condensation can form inside the engine's intake manifold for a variety of reasons. Such reasons may include humid intake air, the intercooler cooling the and an excess of hydrogen in natural gas fuel. The condensate buildup in the intake manifold can cause excess liquid H2O to get pulled into the combustion cylinders. As a result, the fuel mixture in each of the combustion chambers burn at different rates, leading to misfires and lower fuel efficiency. The condensate buildup in the intake manifold is a significant problem with low pressure EGR systems, particularly with NGIC engine systems.

Accordingly, there is a long-felt need for a low pressure EGR system to better mitigate the consequences of condensation in IC and NGIC engine systems.

SUMMARY

1. Modified Low-Pressure EGR System

While the implementation of low-pressure EGR systems in NGIC engines has been known for some time, there is still a demand for improved condensation management. The teachings of the current disclosure improve condensation management in low-pressure EGR systems, in part, by the inclusion of a liquid separator and the linked use of the intercooler and the EGR cooler. The current disclosure manages condensate by avoiding its formation in the intercooler. Known methods for condensate management include forming condensate in the intercooler so that it can then be collected and drained. The current disclosure teaches an avoidance of condensation formation in the intercooler and, instead, uses the EGR cooler for condensate formation. Another modification is the minimized volume of exhaust gas in the line between the EGR valve and the combustion chamber. This modification is to aid in transient response.

2. Liquid Separator, Ejector Nozzle, and Condensate Drain

The innovations of the present disclosure enable the use of a liquid separator to collect condensate that forms in the EGR cooler of the disclosed low-pressure EGR system. Collecting and draining the condensate prior to exhaust gas recirculation minimizes the possibility of condensate buildup in the intake manifold of an NGIC engine system.

3. Linked Intercooler and EGR Cooler Controlled for Dewpoint

The innovations of the present disclosure include the linked operation of an intercooler and an EGR cooler, each being controlled relative to their respective fluid's dewpoint. The temperature of the intercooler is held above a minimum temperature threshold based on the dewpoint of a mixture of intake air and recirculated exhaust gas. The temperature of the EGR cooler is held between a maximum and minimum temperature threshold; the maximum temperature threshold being the dewpoint of the recirculated exhaust gas, the minimum temperature threshold being the freezing point of the resulting condensate. The temperature thresholds of the EGR cooler enable the intentional formation of condensate, which is then collected and ejected from the overall system. The temperature of each cooler is regulated in part by the temperature of one or more coolant loops based on the minimum and maximum temperature thresholds for each cooler. It should also be noted that the intercooler is of the liquid-air type.

4. Preferred Embodiments

Preferred embodiments of the disclosed low-pressure EGR system preferably involve the following: an intake and/or exhaust restriction; an EGR valve; a throttle valve; a turbocharger; a liquid-air intercooler; one or more pumps primarily for regulating coolant flow; one or more heat exchangers for lowering the temperature of the coolant a continuous flow valve with an associated fuel mixer for mixing fuel with a mixture of intake air and recirculated exhaust gas; a liquid-gas EGR cooler; an engine block with associated manifolds and internal components including combustion chambers; one or more ejector nozzles primarily for ejecting condensate from the overall system; a liquid separator being in fluid communication with a condensate drain; an engine control module ("ECM"); and numerous sensors located throughout the system, which transmit sensed readings of temperature, humidity, pressure, and oxygen levels to the ECM.

BRIEF DESCRIPTIONS OF THE DRAWINGS

DETAILED DESCRIPTIONS OF PREFERRED EMBODIMENTS

The following descriptions relate to presently preferred embodiments and are not to be construed as describing limits to the invention, whereas the broader scope of the invention should instead be considered with reference to the claims, which may be now appended or may later be added or amended in this or related applications. Unless indicated otherwise, it is to be understood that terms used in these descriptions generally have the same meanings as those that would be understood by persons of ordinary skill in the art. It should also be understood that terms used are generally intended to have the ordinary meanings that would be understood within the context of the related art, and they generally should not be restricted to formal or ideal definitions, conceptually encompassing equivalents, unless and only to the extent that a particular context clearly requires otherwise.

For purposes of these descriptions, a few wording simplifications should also be understood as universal, except to the extent otherwise clarified in a particular context either in the specification or in particular claims. The use of the term "or" should be understood as referring to alternatives, although it is generally used to mean "and/or" unless explicitly indicated to refer to alternatives only, or unless the alternatives are inherently mutually exclusive. When referencing values, the term "about" may be used to indicate an approximate value, generally one that could be read as being that value plus or minus half of the value. "A" or "an" and the like may mean one or more, unless clearly indicated otherwise. Such "one or more" meanings are most especially intended when references are made in conjunction with open-ended words such as "having," "comprising" or "including." Likewise, "another" object may mean at least a second object or more.

The following descriptions relate principally to preferred embodiments while a few alternative embodiments may also be referenced on occasion, although it should be understood that many other alternative embodiments would also fall within the scope of the invention. It should be appreciated by those of ordinary skill in the art that the techniques disclosed in these examples are thought to represent techniques that function well in the practice of various embodiments, and thus can be considered to constitute preferred modes for their practice. However, in light of the present disclosure, those of ordinary skill in the art should also appreciate that many changes can be made relative to the disclosed embodiments while still obtaining a comparable function or result without departing from the spirit and scope of the invention.

Figure 1:
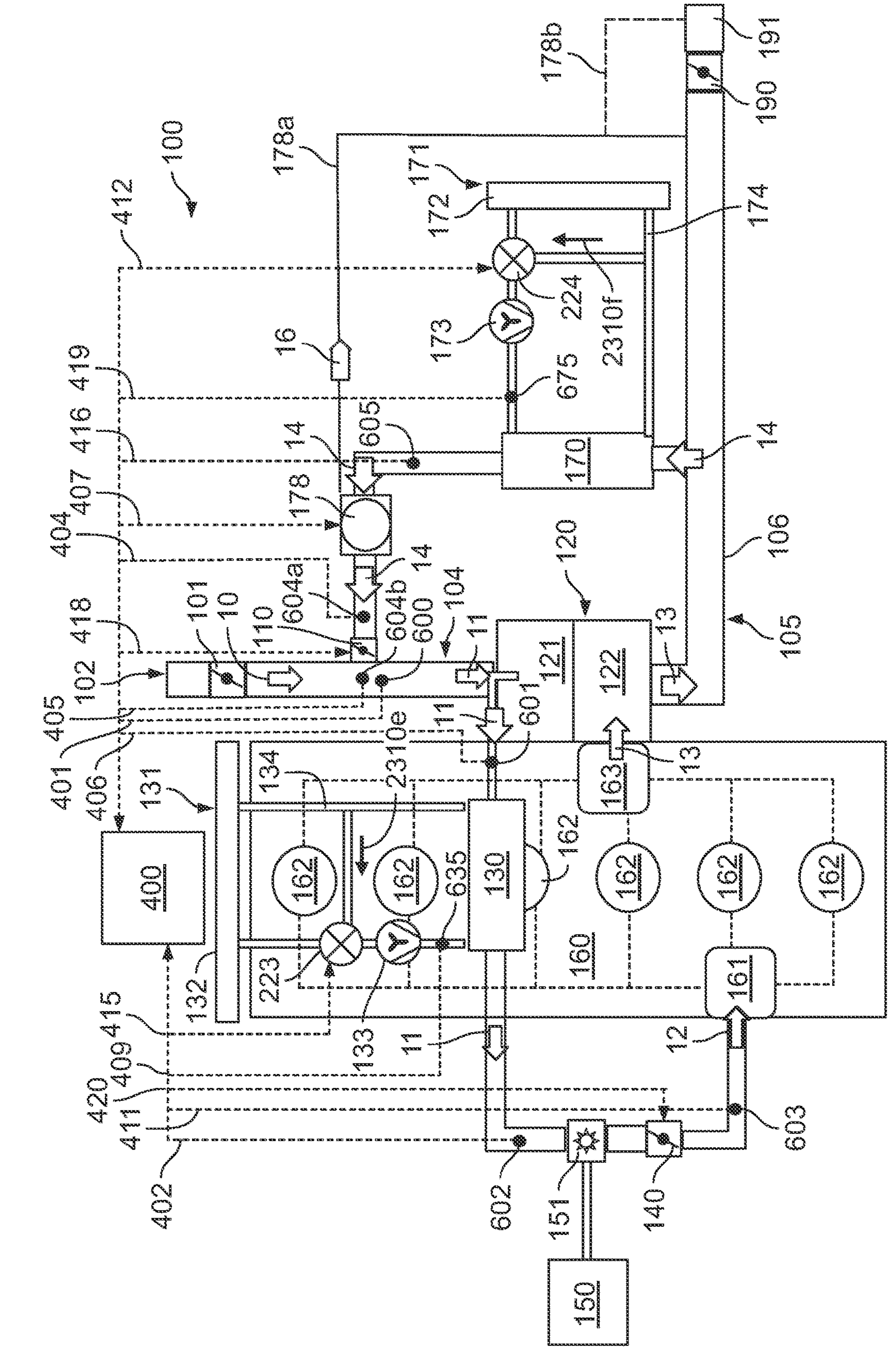
FIG. 1 illustrates a schematic view of an EGR system according to an embodiment of this disclosure.

Looking at FIG. 1, shown is a representative schematic of an embodiment of the disclosed low-pressure EGR system 100 ("system") that utilizes the teachings of the current disclosure. The embodiment shown in FIG. 1 comprises the application of a low pressure EGR system 100 relative to a turbocharger 120 equipped six-cylinder reciprocating IC engine 160 ("engine"). Although a six-cylinder engine is illustrated, one with skill in the art will understand the other embodiments incorporate IC engines with more or less than six cylinders.

To briefly explain the inner workings of a typical IC engine 160 for contextual purposes, those skilled in the art will know that a charge air mixture 12 ("charge air") of fuel, intake air 10, and recirculated exhaust gas 14 into the engine's 160 combustion chambers 162. The charge air is compressed and combusts, forming exhaust gas ("exhaust"), which then exits the combustion chambers 162. In turbo-charger equipped IC engine systems, like the one shown in FIG. 1, an exhaust 13 driven turbocharger 120 is activated from the outlet pressure of the exhaust manifold 163. As the turbocharger's 120 turbine 122 ("turbine") turns, the turbo-charger's 120 compressor 121 ("compressor") establishes a vacuum and pulls a mixture 11 ("air-exhaust gas mixture") of intake air 10 and recirculated exhaust gas 14 towards the compressor's 121 inlet. To explain further, the turbine 122 and the compressor 121 each include a wheel that rotates on a shared axially rotating shaft. The turbine 122 wheel comprises blades with an orientation that opposite of the compressor 121 wheel's blade orientation. The blade's "orientation" refers to the blades having a left-hand curve or a right-hand curve being tangential to the axially rotating shaft passing through the center of both the turbine wheel and the compressor wheel. The blade orientation of the compressor 121 wheel pulls the air-exhaust gas mixture 11 of into the compressor 121 through a compressor 121 inlet.

Intake air 10 is pulled into the system 100 through an associated air intake system 102 and air 10 passes through an air intake restriction 101, which helps establish a pressure gradient to drive the recirculated exhaust gas 14. It should be noted that the term "drive" is used to describe the direction of exhaust gas 14 flow in the system. The term "pressure gradient" is used by those of skill in the art to describe the direction of a rapid pressure differential at a specific location. In other words, an established pressure gradient helps establish the flow direction of air in the intake line. The intake restriction 101 also prevents undesirable particulates from entering the system 100, which could lead to clogging and overall degradation of the system's 100 efficiency. In some embodiments, the intake restriction 101 may be an air filter, intake restriction valve, or the like. For example, intake restriction 101 can be intake restriction 211 discussed in detail in FIGS. 2 and 4. An exhaust restriction 190, which is typically a catalytic converter and/or muffler (such as catalytic converter 191 and muffler 192, discussed in greater detail below), is also used establish a pressure gradient in the system 100 along with cleaning the exhaust of the system. Although FIG. 1 illustrates the application of both an intake restriction 101 and exhaust restriction 190, other embodiments of the current disclosure may utilize one or the other of an intake restriction 101 or an exhaust restriction 190 to the exclusion of the other.

Downstream from the intake restriction 101, the intake air 10 is mixed with recirculated exhaust gas 14; the recirculated exhaust gas 14 being regulated by an EGR valve 110 located upstream the compressor 121. The intake air 10 and recirculated exhaust gas 14 are mixed, referred to as the air-exhaust gas mixture 11, and sucked into the compressor 121. Intake air 10 is mixed with exhaust gas 14 to form mixture 11 is a mixture chamber 104 of intake system 102. Mixture chamber 104 is defined as a section of intake system 102 downstream (according to flow of intake air 10) of restriction valve 101, 211 (intake restriction valve 211 is discussed in further detail below); downstream (according to flow of exhaust gas 14) of EGR valve 110; and upstream (according to flow of mixture 11) of compressor 121. Accordingly, after exhaust gas 14 passes EGR valve 110 and after intake air 10 passes intake restriction valve 110, 211, the air 10 and gas 14 meet in mixture chamber 104 to form exhaust-air mixture 11 before being pulled into compressor 112. In preferred embodiments, the EGR valve 110 is most like a throttle valve, which allows recirculated exhaust gas 14 to be throttled into the intake air 10. Two pressure sensors 604*a*, 604*b* measure a pressure differential across the EGR valve 110. Control of the EGR valve 110 is regulated by the engine control module ("ECM") 400, which manipulates the valve 110 based on readings from an Exhaust Gas Oxygen ("EGO") sensor 601 and two pressure sensors 604*a*, 604*b*. The EGO sensor 601 measures the content of recirculated exhaust gas 14 in the air-exhaust gas mixture 11. The pressure sensors 604*a*, 604*b* in combination measure a pressure differential across the EGR valve 110. One with skill in the art will recognize that ECM 400 can be any computer, processor, controller, or combination thereof typically used for engine control functions.

For measuring the content of recirculated exhaust gas 14 in the air-exhaust gas mixture 11, an Exhaust Gas Oxygen ("EGO") sensor 601 is used. In some embodiments, the EGO sensor 601 may be a universal exhaust gas oxygen ("UEGO") sensor by EControls. The EGO 601 and UEGO alike both measure the oxygen content and can be used to measure oxygen levels and recirculated exhaust gas 14 levels in the air-exhaust gas mixture 11. Both EGO 601 and the UEGO may be used in combination with a humidity and pressure sensor as part of a sensor assembly.

There are specific oxygen levels that correlate to the amount of recirculated exhaust gas 14 in the air-exhaust gas mixture 11. The system 100 is typically designed for the air-exhaust gas mixture 11 to contain up to 20% recirculated exhaust gas 14, however, the present disclosure is sized for a 30% recirculated exhaust gas 14 in the air-exhaust gas mixture 11. To increase or decrease the recirculated exhaust gas 14 content, the EGR valve 110 is adjusted by the ECM 400 based on readings from the EGO sensor 601. The EGO sensor 601 transmits the oxygen levels of the air-exhaust gas mixture 11 to the ECM 400, transmittance shown for illustrative purposes as dashed arrow 406, which adjusts the EGR valve 110. Other embodiments may incorporate a sensor assembly, which may be a combination of the EGO sensor 601 and other sensor types. In alternative embodiments, it should be appreciated that many aspects of the invention can still be beneficial with the recirculated exhaust gas 14 measurement being achieved through some type of pressure and temperature measurement in combination with orifice flow and/or mass flow.

Those with skill in the art will understand that for the recirculated exhaust gas 14 to be mixed with intake air 10 in mixture chamber 104, the pressure in the recirculated exhaust gas 14 passageway (upstream of EGR valve 110) should be greater than the pressure in the intake air mixture chamber 104. This pressure difference is commonly referred to as a "positive pressure differential", which helps prevent the possibility of intake air 10 backflowing into the recirculated exhaust gas 14 passageway. In addition to regulating the content of recirculated exhaust gas 14, the EGR valve 110 also helps maintain the positive pressure differential needed to mix recirculated exhaust gas 14 with intake air 10 in mixture chamber 104. When the EGR valve 110 is partially or fully closed, pressure is allowed to build up in the recirculated exhaust gas 14 passageway upstream of EGR valve 110.

To maintain a positive pressure differential across the EGR valve 110, the ECM 400 receives pressure readings from a first pressure sensor 604*a* and a second pressure sensor 604*b*, and then controls the EGR valve 110 based on those readings. Control of the EGR valve 110 by the ECM 400 is represented by dashed arrow 418. The first pressure sensor 604*a*, located upstream to the EGR valve 110, measures a first pressure; the first pressure being the pressure in the recirculated exhaust gas 14 passageway. The second pressure sensor 604*b*, located downstream from the EGR valve 110, measures a second pressure P2; the second pressure P2 being the pressure in the mixture chamber 104. Transmittance of the pressure readings from the pressure sensors 604*a*, 604*b* to ECM 400 are shown for illustrative purposes as dashed arrows 404 and 405. Under normal operating conditions, the pressure upstream to the EGR valve 110 measured by sensor 604*a* should be held greater than the pressure downstream from the EGR valve 110 measured by 604*b*. If the pressure downstream from the EGR valve 110 is measured to be greater than the pressure upstream of EGR valve 110, the ECM 400 can adjust the EGR valve 110 to compensate for the pressure difference. Additionally, ECM 400 can adjust intake restriction valve 101, 211 to compensate for the pressure differential at EGR valve 110.

Though the compressor 121 is primarily used to increase the oxygen content of the air-exhaust gas mixture 11, the compression of mixture 11 raises the temperature of mixture 11, which causes the air-exhaust gas mixture 11 to expand downstream from the compressor 121. Due to this expansion, the oxygen content of the air-exhaust gas mixture 11 decreases per unit volume. To maintain the oxygen content, the air-exhaust gas mixture 11 passes through an intercooler 130, which cools the air-exhaust gas mixture 11. In the context of the current disclosure, the intercooler 130 is a liquid-air heat exchanger that cools the air-exhaust mixture 11 with an associated liquid heat exchange system 131. In context of the present disclosure, the coolant can be water, refrigerant, oil, or any other fluid used for heat exchange purposes. Heat exchange system 131 comprises a loop 134, a pump 133, a bypass valve 223, and a heat exchanger 132. The heat exchanger 132 represented in FIG. 1 is a liquid-air heat exchanger, such as, for example, a radiator, which circulates the coolant through channels. Air is blown over the channels, absorbs heat from the coolant, and lowers the temperature of the coolant.

While circulating through the intercooler 130, the coolant absorbs heat from the air-exhaust gas mixture 11. Flow of the coolant loop 134 is regulated by the pump 133, which is maintained at a constant speed to maintain pressure in the coolant loop 134. Preferred embodiments of the current disclosure may comprise an electric pump, while other embodiments may use a belt driven or mechanical pump. The bypass valve 223, controlled by the ECM 400 based on readings from a temperature sensor 635, enables hot coolant to bypass the heat exchanger 132. In preferred embodiments of the current disclosure, the bypass valve 223 is an electrically operated solenoid valve. As discussed in greater detail below, in certain situations, such as cold weather conditions, the bypass valve 223 is opened as part of the system's 100 start-up process to allow the coolant system 131 to warm up to a temperature above a threshold temperature. In some embodiments, the threshold temperature is 40 degrees Fahrenheit with a tolerance of +/−1.5 degrees Fahrenheit. For illustrative purposes, the bypass flow of coolant in coolant system 131 is represented as flow arrow 2310*e*. Control of the bypass valve 223 by the ECM 400 is shown for illustrative purposes as dashed arrow 415. Transmittance of temperature readings from the temperature sensor 635 to the ECM 400 is shown for illustrative purposes as dashed arrow 409. To adjust how much heat is absorbed by the coolant while circulating in the intercooler 130, the bypass valve 223 is further purposed for adjusting the coolant temperature, depending on the amount of heat absorption needed to maintain the temperature of the air-exhaust gas mixture 11 high enough to prevent condensate formation, e.g. above the air-exhaust gas mixture 11 dew point. Those of skill in the art will appreciate that the term "dew point" refers to the temperature at which a vapor changes to a liquid, which may also be referred to as condensation temperature or condensation point. In the context of the current disclosure, the dew point is the worst-case scenario dew point+/−1.5 Fahrenheit.

One major reason for maintaining the temperature of the air-exhaust gas mixture 11 above its dewpoint is to prevent condensation, which is part of the current disclosure's method for improving condensate management. To provide more context, if the air-exhaust gas mixture 11 is cooled to a temperature below the air-exhaust gas mixture's 11 dew point, condensation may occur. Through use of the intercooler's 130 heat exchange system 131, the air-exhaust gas mixture 11 temperature is maintained above its dew point to prevent such condensation at this juncture in the system 100.

After passing through the intercooler 130, the air-exhaust gas mixture 11 is further mixed by a fuel mixer 151, which is coupled to a continuous flow valve 150 ("CFV"). Other embodiments may incorporate a fuel injector or another type of fuel introduction technology. Fuel is drawn by the CFV 150 from a fuel source and circulates to the mixer 151, where a charge air mixture 12 ("charge air") is formed; charge air 12 being the mixture of fuel and the air-exhaust gas mixture 11.

Downstream from the mixer 151, the charge air 12 is throttled into an intake manifold 161, via throttle valve 140, and is distributed to each of the combustion cylinders 162 in the engine 160 block. A Temperature and Throttle Inlet Pressure ("TTIP") sensor 602 which measures the pressure and temperature of the air-exhaust gas mixture 11 downstream from the turbo compressor 121 and upstream to the fuel mixer 151. In preferred embodiments, the TTIP sensor 602 is a pressure transducer with an added temperature probe that measures temperature with a tolerance of +/−1.5 F. The pressure being measured by the TTIP sensor 602 is, in part, for determining the pressure differential across the throttle valve 140, as well as to ensure operating pressure ranges are maintained. The readings from the TTIP sensor 602 are transmitted to the ECM 400, shown for illustrative purposes as dashed arrow 402.

To control the amount of charge air mixture 12 entering the combustion chambers 162, the ECM 400 adjusts the throttle valve 140 based on readings from both the TTIP sensor 602 and a Manifold Absolute Pressure ("MAP") sensor 603. Control of the throttle valve 140 by the ECM 400 is represented by dashed arrow 420. A negative pressure differential across the throttle valve 140 is needed to establish an intake vacuum, which is achieved by maintaining the pressure of the intake manifold below the pressure upstream to the throttle valve 140. In combination, the TTIP sensor 602 and the MAP sensor 603 enable a pressure differential across the throttle valve 140 to be measured. The MAP sensor 603, disposed upstream to the intake manifold, measures the pressure upstream to the intake manifold 161. The TTIP sensor 602 measures pressure upstream to the throttle valve 140. Sensed readings from the MAP sensor 603 are transmitted to the ECM 400, shown for illustrative purposes as dashed arrow 411. Sensed readings transmitted from the TTIP sensor 602 to the ECM 400 are shown for illustrative purposes as dashed arrow 402. In alternative embodiments, it should be appreciated that many aspects of the invention can still be beneficial with the recirculated exhaust gas measurement being achieved through some type of pressure and temperature measurement in combination with orifice flow and/or mass flow.

For better transient response, the volume of the passageway between the recirculation point of recirculated exhaust gas 14 and the throttle valve 140 is minimized. In the context of the current disclosure, the term "transient" is used to describe high power load operating conditions where there is an increased demand for a more powerful combustion. A throttle valve's "transient response" refers to the sudden and most open setting of the associated throttle valve, which increases the levels of charge air mixture 12 being drawn into the combustion chamber 162. By minimizing volume between the recirculation point of recirculated exhaust gas 14 and the throttle valve 140, pressure upstream to the throttle valve 140 is allowed to build up more rapidly, which enables the throttle valve 140 to release a higher pressure as part of its transient response.

After combustion, exhaust gas 13 is formed and exits the combustion cylinders 162, which passes through the exhaust manifold 163 before entering the turbine 122. Downstream from the turbine 122, the exhaust gas 13 flows through an exhaust system 105 and exits the system 100. Exhaust system 103 comprises an exhaust pipe 106 that carries exhaust from turbocharger 120 to exhaust restriction 190. In some embodiments, the exhaust 13 passes through an exhaust restriction 190 before exiting the system 100. Downstream from the turbine 122, a portion of the exhaust gas is drawn from the exhaust system 105 for recirculation, shown at arrow 14.

The recirculated exhaust gas 14 passes through an EGR cooler 170, which is configured to lower the temperature of the recirculated exhaust gas intentionally below the dew point of the recirculated exhaust gas 14. In the context of the current disclosure, the EGR cooler 170 is a liquid-gas heat exchanger constructed from stainless steel or another anticorrosive and heat-resistant material. By lowering the temperature of the recirculated exhaust gas 14 below its dew point, condensate is purposefully allowed to form and can be easily collected for ejection from the system 100. It should be noted that the EGR cooler 170 maintains the temperature at a range between the dewpoint and freezing point+/−1.5 F of recirculated exhaust gas 14. Accordingly, EGR cooler 170 is a form of condensate management for system 100. Exhaust gas 14 inherently hold gases that forms moisture when recirculated through system 100. If moisture is allowed to form and enter engine 160, engine can become inefficient or can even be damaged. Accordingly, EGR cooler 170 is configured to lower the temperature of exhaust gas 14 to as cold as possible so that the gas 14 can condensate to form an exhaust liquid and as much exhaust liquid as possible can be pulled from exhaust gas 14 before it enters engine 160.

The EGR cooler 170 uses an associated heat exchange system 171 to absorb heat from the recirculated exhaust gas 14. The associated heat exchange system 171 comprises a coolant loop 174, a pump 173, a bypass valve 224, and a heat exchanger 172. The EGR cooler's 170 coolant loop 174 cycles through the EGR cooler 170, an associated pump 173, and an associated heat exchanger 172. In context of the present disclosure, the coolant fluid of heat exchange system 171 can be water, refrigerant, oil, or any other fluid used for cooling purposes. While circulating through the EGR cooler 170, the coolant absorbs heat from the recirculated exhaust gas 14. Flow of the coolant loop 174 is regulated by the pump 173, which is maintained at a constant speed to maintain pressure in the coolant loop 174. The bypass valve 224, controlled by the ECM 400 based on readings from a temperature sensor 675, enables coolant to bypass the heat exchanger 172. For illustrative purposes, the bypass flow of coolant in coolant system 171 is represented as flow arrow **2310*f*. For cold weather conditions, the bypass valve 224 is opened as part of the system's 100 start-up process to allow the coolant system 171 to warm up to a temperature above the threshold temperature, which in some embodiments is 40 degrees Fahrenheit. Control of the bypass valve 224 is shown for illustrative purposes as dashed arrow 412. Transmittance of temperature readings from the temperature sensor 675 to the ECM 400 is shown for illustrative purposes as dashed arrow 419. Transmittance of temperature readings from the temperature sensor 605 to the ECM 400 is shown for illustrative purposes as dashed arrow 416. To adjust how much heat is absorbed by the coolant while circulating in the EGR cooler 170, the bypass valve 224 is further purposed for adjusting the coolant temperature, depending on the amount of heat absorption needed to lower the temperature of the recirculated exhaust gas 14 enough for condensate formation. e.g. below the recirculated exhaust gas 14** dew point. Those of skill in the art will appreciate that the term "dew point" refers to the temperature at which a vapor changes to a liquid, which may also be referred to as condensation temperature or condensation point. In the context of the current disclosure, the dew point is the worst-case scenario dew point temperature+/−1.5 Fahrenheit.

While some embodiments of the current disclosure include an EGR cooler 170 designed to collect and drain condensate (shown in FIGS. 2-5), the embodiment shown in FIG. 1 utilizes a liquid separator 178 to collect and drain condensate from the system 100. However, the inclusion of such a liquid separator 178 is not an exhaustive representation of systems like the system 100 shown, which may include an EGR cooler 170 designed for condensate collection and ejection. The liquid separator 178 is controlled by the ECM 400, shown for illustrative purposes as dashed arrow 407. In preferred embodiments, the liquid separator 178 may be a cyclone separator, which uses a vortex to separate the condensate from the recirculated exhaust gas 14. The condensate, shown for illustrative purposes as arrow 16, is expelled into a drainpipe **178*a*, circulated back into the exhaust line upstream of exhaust restriction 190, and then expelled from the system 100. Alternatively, the condensate may be drained into the exhaust line 170 downstream of the exhaust restriction 190, shown for illustrative purposes as dashed line 178*b*. In the context of the current disclosure, the exhaust restriction 190** is a catalytic converter and/or a muffler. Those of skill in the art will know the importance of a catalytic converter's use in the treatment of emissions.

As part of the current disclosure's condensation management, liquid separator 178 can be controlled based on humidity of the exhaust-air mixture 11. Each heat exchange system 131, 171 can also be controlled based on the humidity of exhaust-air mixture 11. In some embodiments of the current disclosure, temperature and humidity are both measured by a humidity sensor 600 disposed downstream from the EGR valve 110. Such preferred embodiments may employ the EnviroTech humidity sensor by EControls, which is configured to measure humidity, temperature, and pressure. The humidity sensor 600 preferably is configured to at least measure humidity and the air temperature and pressure upstream to the compressor 121. Humidity and air temperature and pressure readings are transmitted from the humidity sensor 600 to the ECM 400, shown for illustrative purposes as dashed arrow 401. Alternative embodiments can have the humidity sensor 600 disposed downstream from the compressor 121 and upstream of the intercooler 130. The humidity sensor 600 may also be alternatively located downstream from the intercooler 130.

Downstream from the liquid separator 178, an EGR valve 110 allows recirculated exhaust gas 14 to enter mixture chamber 104. The EGR valve 110 is adjusted by the ECM 400, and can be adjusted based on a number of different factors, such as oxygen content of the air-exhaust gas mixture 11.

Figure 2:
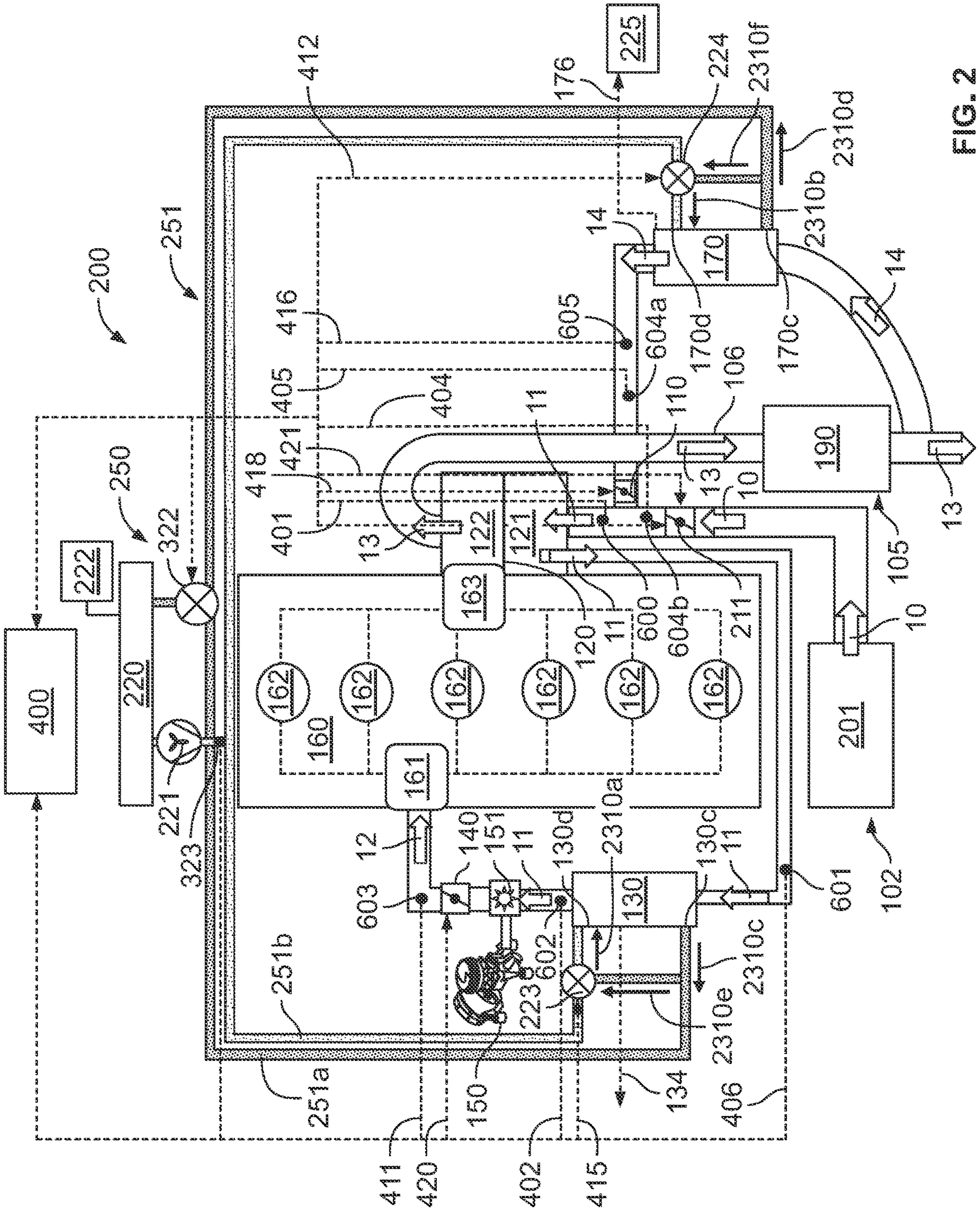
FIG. 2 illustrates a schematic view an EGR system, according to another embodiment of this disclosure.

Looking to FIG. 2, shown is a representative schematic of an embodiment of the disclosed low pressure EGR system 200. The system 200 shown in FIG. 2 is substantially similar to system 100 previously described, but has some differences. It should be evident that a single heat exchange system 250 is configured for operation with both the intercooler 130 and the EGR cooler 170. To provide context, the system 100 represented in FIG. 1 discloses a separate heat exchange system 131, 171 for each cooler 130, 170. Another difference is the addition of a split valve 322, which operatively distributes the coolant supply to each of the coolers 130, 170. Other features represented in FIG. 2, shown is the coupling of an air filter 201 and an intake restriction valve ("IRV") 211; the intercooler 130 being coupled with a condensate drain 134 for cold weather shutdown of the system 200; the EGR cooler 170 being coupled with a condensate drain 176; and condensation management without a liquid separator 178. In preferred embodiments of the system 200, condensate drain 176 is equipped with a condensate ejection system 700 (shown in FIG. 4), which comprises pneumatic plumbing and an ejector nozzle 225 being operable from a small amount of air supplied from either the TTIP sensor 604 or an air brake system 228.

The heat exchange system 250, configured to supply coolant to both the intercooler 130 and the EGR cooler 170, comprises a coolant loop 251, bypass valves 223, 224, a pump 221, a split valve 322, a heat exchanger 220, and an expansion tank 222. The coolant fluid can be water, refrigerant, oil, or any other fluid used for heat exchange purposes. To provide the further context of the heat exchange system 250, in preferred embodiments, the coolant loop 251, bypass pass valves 223, 224, and heat exchanger 220 retain the characteristics as previously described embodiments which utilize the inclusion thereof. The split valve 322 is preferably an electrically actuated ball valve.

While circulating through the heat exchanger 220, return coolant passes through return line 251*a*, allowing heat from the return coolant to be transferred to air blowing over past heat exchanger 220. Due to the convective heat transfer taking place, the temperature of the coolant decreases, and cold coolant is supplied to intercooler 130 and EGR cooler 170 by supply line 251*b*. To regulate the coolant's flow, the pump 221 is controlled at a constant speed, which maintains substantial pressure in the coolant loop 251 to enable steady flow of the coolant. To account for the expansion of hot coolant, the expansion tank 222 collects coolant overflow from the heat exchanger 220. Upon exit from the heat exchanger 220, according to some embodiments, the coolant may reach temperatures of 115 F Fahrenheit.

By positioning the split valve 322, the coolant supply is divided and sent towards both the intercooler 130 and the EGR cooler 170. The term "coolant supply" may be used to describe the coolant of supply line 251*a*. Generally, the split valve 322 proportionally channels coolant in return line 251*a* from each of the coolers 130, 170, enabling coolant flow to be adjusted, which also adjusts the heat transfer rate of each cooler 130, 170. The split valve 322 is preferably positioned in such a way that enables the EGR cooler 170 to receive a coolant supply from supply line 251*b* at a characteristically higher flow rate than the coolant supply received by the intercooler 130 from supply line 251*b*. However, the split valve 322 can also be positioned to direct the flow coolant supply 251*b* equally, or more or less towards either of the coolers 130, 170 to meet cooling demands. Depending on the application, the intercooler 130 may demand lower heat transfer rates than the EGR cooler 170. When compared to the intercooler 130, the EGR cooler 170 generally needs a greater amount of coolant to maintain the temperature of the recirculated exhaust gas 14 below its dewpoint. In preferred embodiments, the coolant supply of supply line 251*b* flows towards the EGR cooler 170 at an approximate flow rate of 18.1 gallons/minute; the coolant supply of supply line 251*b* flows towards the intercooler 130 at an approximate flow rate of 12.1 gallons/minute, and the flow rates are accomplished according to the position at which split valve 322 is set. One reason for this difference is that the EGR cooler 170 demands a higher heat transfer rate than the intercooler 130, as in operation, EGR cooler 170 is configured to lower the temperature of hot exhaust gas 14 below the dew point temperature so that condensation occurs and intercooler 130 is configured to keep the temperature of mixture gas at a temperature above the dew point. Said another way, EGR cooler 170 is configured to liquify at least part of exhaust gas 14 to for an exhaust gas liquid. Thus, EGR cooler 170 must transfer more heat from the gas to the coolant than intercooler 130. Other embodiments may manipulate the coolant's passageway inner diameter to achieve the coolant supply flow rate effect as described herein.

Looking to arrows 2310*a* and 2310*b*, the coolant enters the intercooler 130 at a fluid coolant inlet 130*d* shown at arrow 2310*a*, and enters the EGR cooler 170 at a fluid coolant inlet 170*d*, shown at arrow 2310*b*. Looking to arrows 2310*c* and 2310*d*, the coolant passes through a coolant fluid flow path of intercooler 130 and exits the intercooler 130 at a fluid coolant outlet 130*c*, shown at arrow 2310*c*, and passes through a coolant fluid flow path of EGR cooler 170 and exits the EGR cooler 170 ant coolant outlet 170*c*, shown at arrow 2310*d*. While circulating through the intercooler 130 and the EGR cooler 170, the coolant absorbs heat from the mixture 11 and the recirculated exhaust gas 14, respectively. According to some embodiments, upon exit from both the intercooler 130 and the EGR cooler 170, the coolant may reach temperatures of 155 F.

To regulate the temperature of the coolant, the ECM 400 controls bypass valves 223, 224 based on temperature readings from a temperature sensor 323 downstream from the pump 221. The positioning of the bypass valves 223, 224 shown in FIG. 2 is intended to allow portions of hot coolant to be circulated with cold coolant to raise the temperature of the coolant to approximately 40 F, particularly during start-up of system 200.

Split valve 322 is disposed in return line 251*a* and is configured to receive return coolant from both the intercooler 130 and EGR cooler 170 (see flow arrows 2310*c*, 2310*d*) and direct the return coolant to heat exchanger 220. In preferred embodiments of the current disclosure, the split valve 322 is an electrically controlled ball split valve configured to restrict coolant flow from each cooler 130,170. However, those of skill in the art will appreciate that there are many types of split valves that could be implemented as part of the current disclosure. Split valve 322 can control the flow of coolant so that a coolant flow from one cooler 130, 170 is restricted and coolant flow from the other cooler 130, 170 is less restricted. Similarly, split valve 322 can control coolant flow such that coolant flow from cooler 130 is substantially equal to the fluid flow of 170. As the coolant flow is restricted, backpressure is allowed to build up, which causes the coolant supply flow to slow down. As the coolant supply flow slows down, there is less supply coolant being supplied to the affected cooler, which decreases the cooling rate of the affected cooler.

As will be discussed in greater detail below, the split valve 322 adjusts coolant according to the demands of the intercooler 130, which is operated to maintain the temperature of the air-exhaust gas mixture 11 above its dewpoint. If the temperature of the air-exhaust gas mixture 11 is below its dewpoint, coolant flow 2310*c* from the intercooler 130 is restricted by split valve 322 so that there is less cold coolant circulating therethrough. Depending on the demands of the intercooler 130, the position of the splitting mechanism of the split valve 322 is adjusted over a range of positions to enable more or less restriction of coolant flow 2310*c* from the intercooler 130. It should be evident by those of skill in the art that if the flow of coolant 2310*c* from the intercooler 130 is decreased by being restricted, the flow of coolant 2310*d* from the EGR cooler 170 is increased by being less restricted. Furthermore, those of skill in the art will appreciate that the split valve 322 of the current disclosure is disposed so that splitting of the coolant flow is achieved by restricting the cooler's 130, 170 coolant return 251*a*, rather than dividing and distributing the coolant supply of each cooler 130, 170. The flow of the coolant is increased or decreased based on the amount of backpressure caused by the restriction in the split valve 322. However, one with skill in the art will recognize that according to some embodiments that split valve 322 can be integrated with coolant supply line 251*b*, and coolant can be divided between cooler 130 and cooler 170 by split valve 322 after is has been cooled by heat exchanger 220 and before it is supplied to coolers 130 and 170.

Figure 3A:
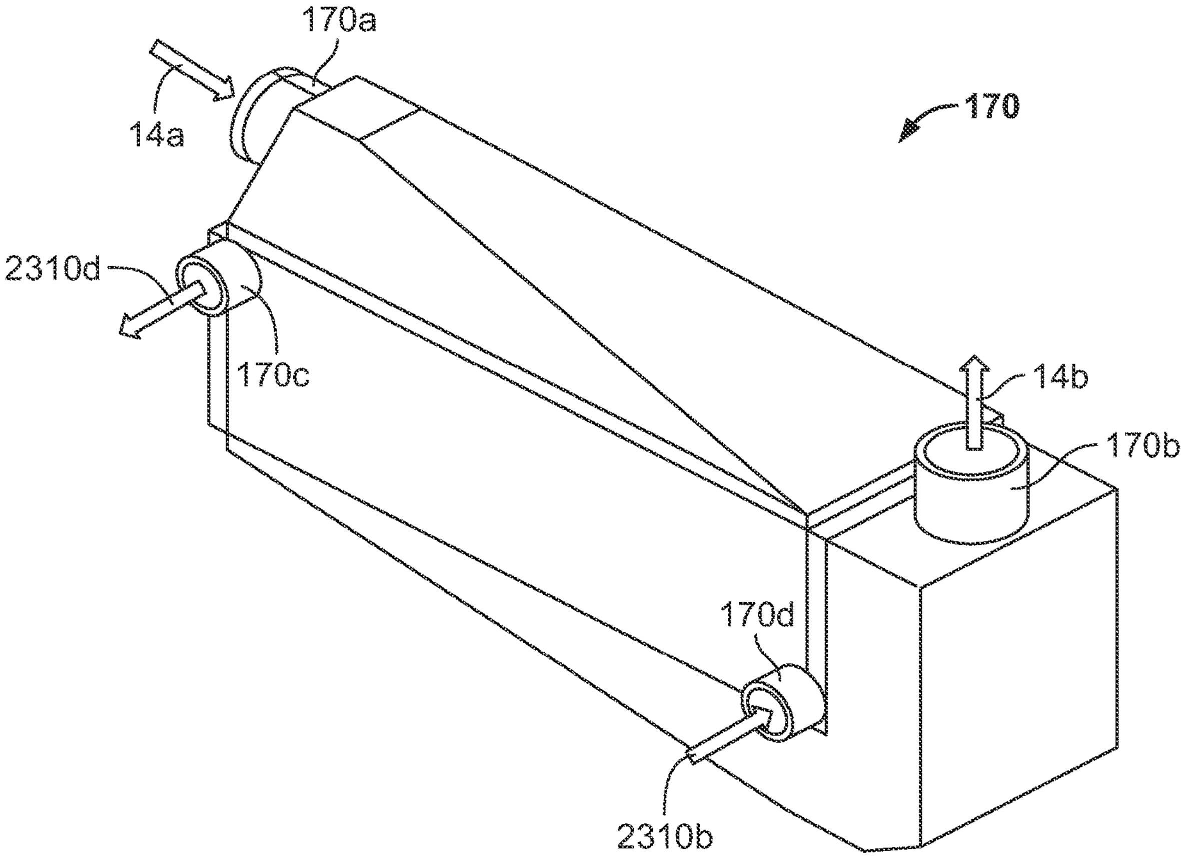
FIG. 3A illustrates a perspective view of an EGR cooler according to an embodiment of this disclosure.
Figure 3B:
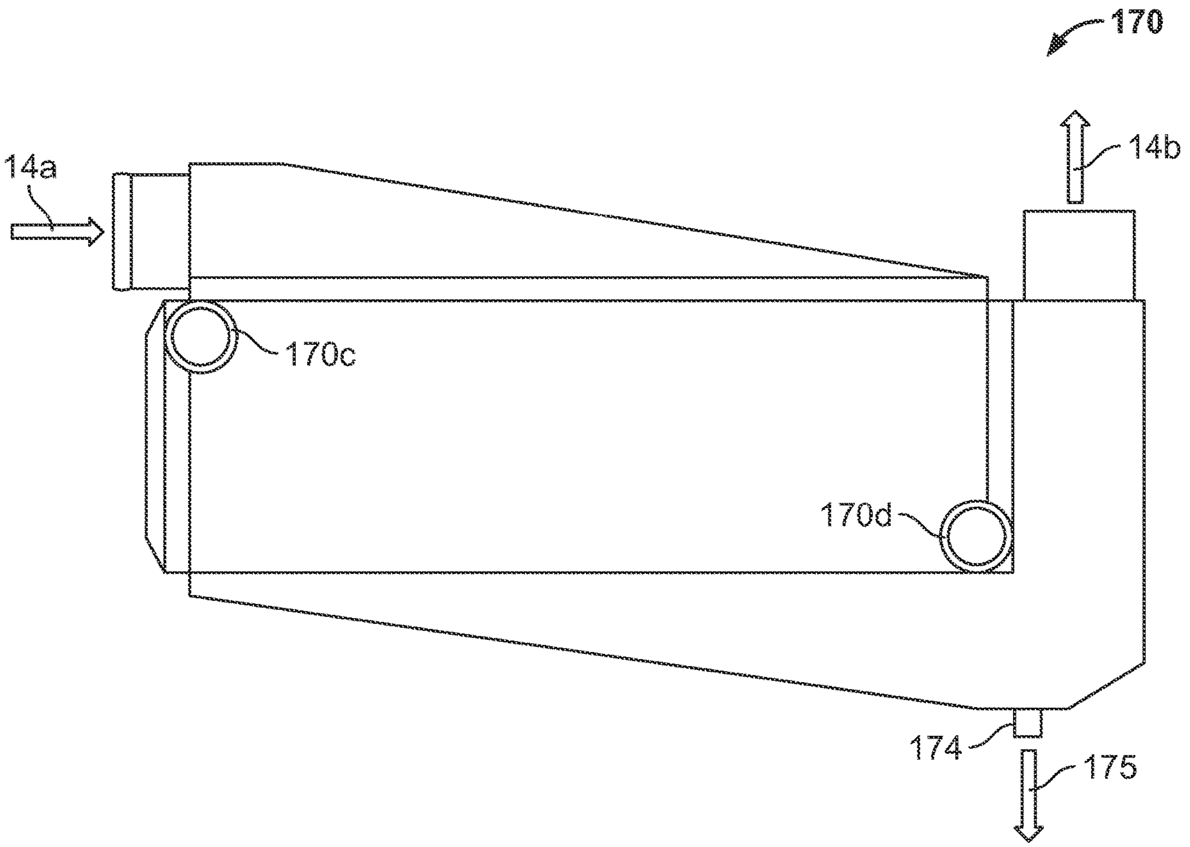
FIG. 3B illustrates a side of the EGR cooler of FIG. 3A.

Looking to FIG. 3A and FIG. 3B, shown are views of the EGR cooler 170 with arrows 14*a*, 14*b* representative of the recirculated exhaust gas 14 flow direction. The recirculated exhaust gas 14 enter the EGR cooler 170 at an inlet 170*a* and exits at an outlet 170*b*. FIG. 3A also includes arrows 2310*d*, 2310*b* representative of the coolant flow direction relative to the EGR cooler's 170 coolant loop inlet and coolant loop outlet. The coolant loop 174 enters the EGR cooler 170 at a coolant supply inlet 170*c* and exits at a coolant return outlet 170*d*. FIG. 3B illustrates the EGR cooler's 170 condensate drain 176 along with arrow 175 representative of the condensate's (also referred to as the exhaust gas liquid) flow direction. In some embodiments, the condensate drain 176 may extend to connect with an ejector nozzle 225, as shown in FIG. 4.

Figure 4:
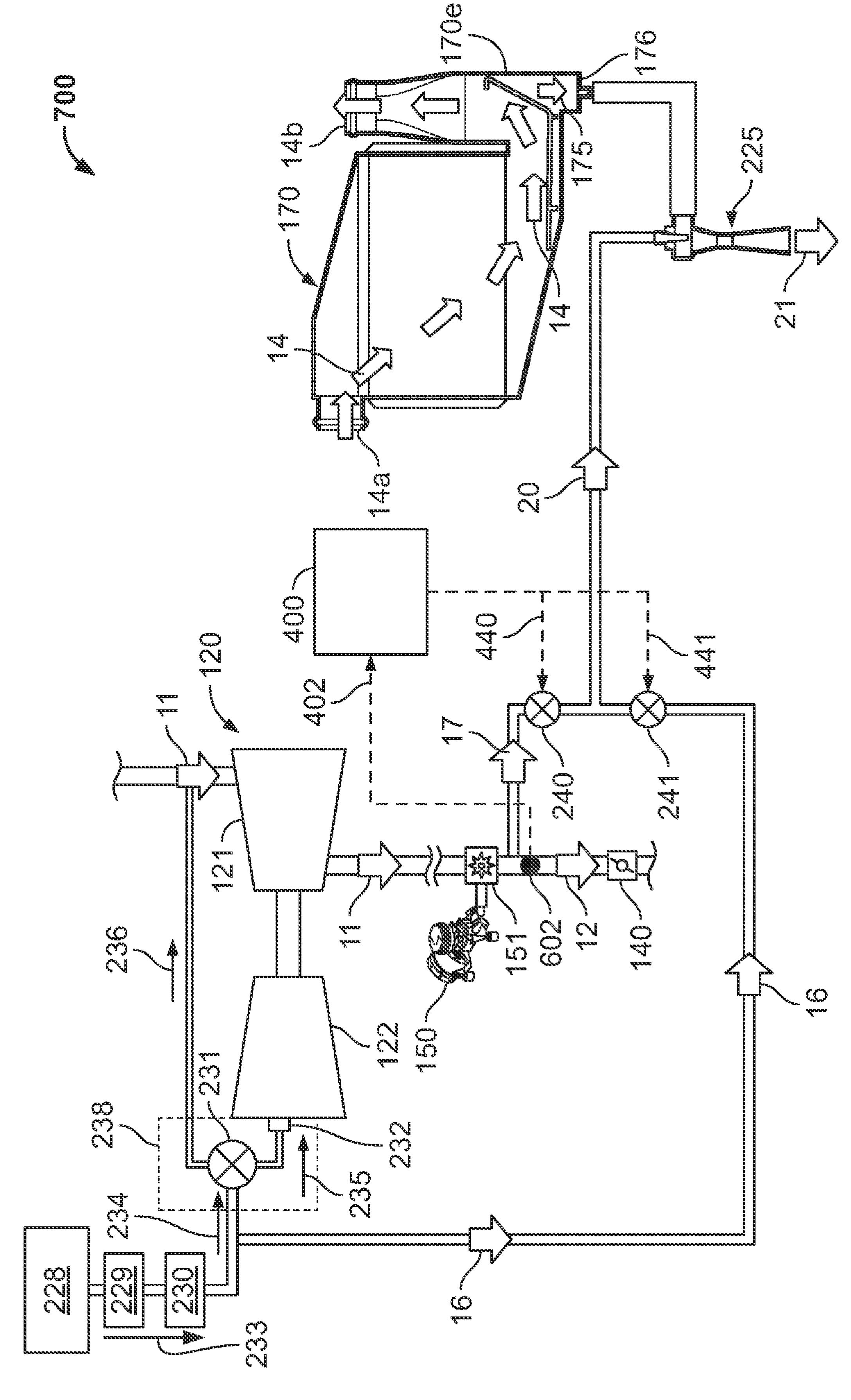
FIG. 4 illustrates a schematic view of an EGR cooler with a condensate ejection system according to an embodiment of this disclosure.

Looking to FIG. 4, shown is a representative schematic of a condensate ejection system 700 coupled to the EGR cooler 170. The condensate ejection system 700 comprises pneumatic plumbing and an ejector nozzle 225 being operable from an air supply, the air supply being a vehicle's air brake system 228 or compressor 121. Shown for illustrative purposes, flow arrows the recirculated exhaust gas 14 as it passes through the EGR cooler 170. As the recirculated exhaust gas 14 cools below its dewpoint, the water vapor in the recirculated exhaust gas 14 condenses and drops out at the bottom portion 170*e* of the EGR cooler 170. Condensate forms at the bottom portion 170*e* of the EGR cooler 170 and is drained, represented as arrow 175, through a condensate drain 176 that is functional with gravitational force. For scenarios involving excessive buildup of condensate in the EGR cooler 170, the ejector nozzle 225 enables condensate to be sucked out of the EGR cooler 170 in addition to the gravitational force acting on the condensate. The ejector nozzle 225 operates using compressed air 20 supplied by either compressor 121 (shown as arrow 17) or an auxiliary air source, such as compressed air from the vehicle's air brake system 228 (shown as arrow 16). The air 20 blowing through the ejector nozzle 225 establishes a negative pressure differential between the ejector nozzle 225 pressure and the pressure inside the EGR cooler 170. The vacuum created from this pressure differential enables condensate 175 to be drawn from the EGR cooler 170 and into the ejector nozzle 225 an expelled. In some embodiment, nozzle 225 may expel the condensate and pressurized air into exhaust system 105. For example, the nozzle 225 can include a drain line, such as drain lines 178*a*, 178*b* that is used to expel a condensate and pressurized air mixture 21 into exhaust system 105.

Under normal operating conditions, the condensate ejection system 700 is operable by air 17 from taken downstream from the compressor 121. However, being that the current disclosure involves an exhaust driven turbocharger 120, there are times that where the turbocharge is not charged enough for compressor 120 to sufficiently supply air to nozzle 225, such as during engine start-up and idling. At these times, air flow from the compressor 121 is significantly reduced, resulting in a pressure that is lower than the threshold needed to maintain suction from the ejector nozzle 225.

During engine start-up and idling, a small portion of compressed air 16 from the vehicle's air brake system 228 is used to maintain ejector nozzle 225 suction pressure. Air brake system 228 is associated with a vehicle powered by engine 160. Additionally, the vehicle's air brake system 228 is drawn to operate the turbocharger's 120 wastegate 238. The primary function of the wastegate 238 is to relieve pressure from the turbine 122. Looking to flow arrows 233, 234, 235, air from the vehicle's air brake system 228 passes through an air filter 229, an air supply regulator 230, a wastegate control valve 231, and then triggers a pneumatic actuator 232. Depending on when pressure relief is demanded, the wastegate control valve 231 will direct air towards the actuator 232, shown as arrow 235, or to the intake air 11 passageway, shown as arrow 236. As shown in FIG. 4, air 16 supplied to nozzle 225 is take from air brake system 228 upstream of the wastegate 238.

To select between air sources, the ECM 400 controls a first valve 240 and a second valve 241. Valve 240 is configured to be opened and close to allow and shut off air flow from the compressor 121. Valve 241 is configured to be opened and close to allow and shut off air flow from the vehicle air brake system 228. If the air pressure from the TTIP sensor 602 is below the pressure threshold needed to create ejector nozzle 225 suction, ECM closes first valve 240 and opens second valve 241, allowing air flow from the vehicle's air brake system 228 to be supplied to nozzle 225. When air pressure measured by TTIP sensor surpasses threshold needed to create ejector nozzle 225 suction, ECM 400 opens valve 240 and closes valve 241, allowing air from compressor 221 to be supplied to nozzle 225. Both the first valve 240 and the second valve 241 are controlled by the ECM 400 based on pressure readings from the TTIP sensor 602. Other embodiments may use a three-way valve instead of valves 240 and 241 to enable flow from either compressor 221 or vehicle brake system 228. Control of the first valve

240 and the second valve 241 by the ECM 400 are represented, respectively, by dashed arrows 440, 441.

Figure 5:
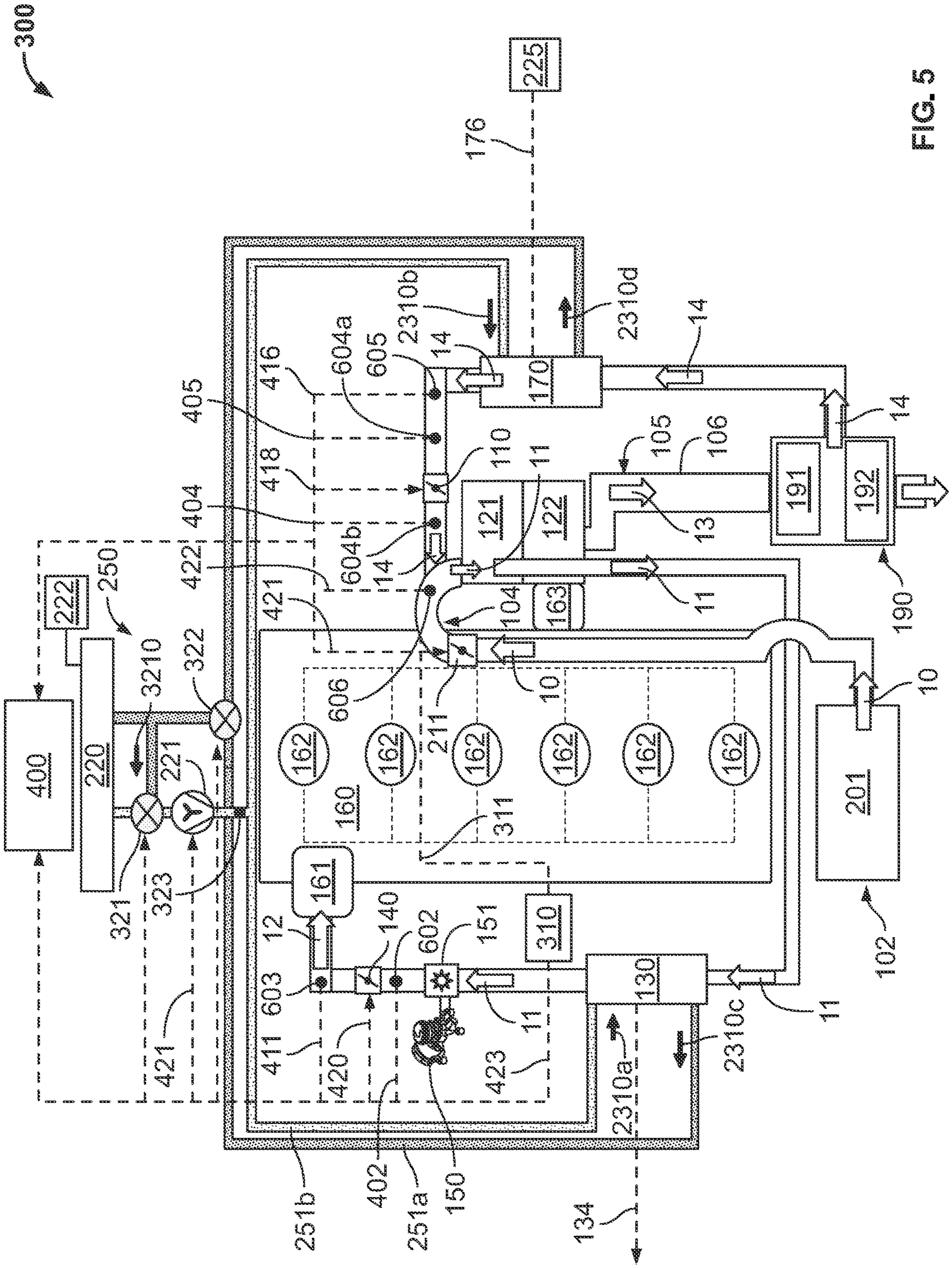
FIG. 5 illustrates a schematic view an EGR system, according to another embodiment of this disclosure.

Looking to FIG. 5, shown is a representative schematic of another embodiment of the disclosed low-pressure EGR system 300 ("system"). The system 300 is substantially similar to systems 100, 200, however it should be evident that the system 300 has some differences. One with skill in art will understand that components of systems 100, 200, 300 can be combined in different embodiments of this disclosure. One notable difference in system 300 is that the heat exchange system 250 comprises a bypass valve 321. Much like the previously discussed bypass valves 223, 224, the bypass valve 321 of the heat exchange system 250 shown in FIG. 5 enables coolant of return line 251*a* to bypass the heat exchanger 220, which raises the temperature of the coolant and helps with de-icing the system 300 during cold weather applications. The coolant split valve 322 proportionally channels hot coolant from each of the coolers, enabling coolant flow to be adjusted, which also adjusts the heat transfer rate of each cooler 130,170. The bypass valve 321 is controlled by the ECM 400 based on temperature measurements from a temperature sensor 323 downstream of the coolant pump 221. For example, as will be discussed in greater detail below, if sensor 323 measures the temperature of the supply fluid to be below a predetermined threshold temperature, the ECM 400 can open the bypass valve 321 such that return fluid of line 251*a* bypasses heat exchanger 220 and is supplied directly to supply line 251*b*. When the sensor 323 measures that the temperature of the supply fluid in supply line 251*b* meets or surpasses the threshold temperature, ECM can position bypass valve 321 such that return fluid of return line 251*a* is delivered through heat exchanger 220 to be cooled prior to being sent to supply lines 251*b*.

System 300 includes the addition of a pressure sensor 606 and the use of a sensor assembly 310. Control of the IRV 211 can be done ECM 400 based on readings from pressure sensor 606 and/pr sensor assembly 310, and is represented by dashed arrow 421. The IRV 211 can also be configured to enable more control over the pressure differential across the EGR valve 110, which ultimately allows more recirculated exhaust gas 14 to build up in the intake air 10 passageway. The IRV 211 can be controlled by the ECM 400 based on pressure readings from a pressure sensor 606 and/or sensor assembly 310.

Sensor assembly 310 comprises a combination of sensors used to measure pressure, temperature, humidity, and oxygen content at a single point in the system 300. Preferred embodiments of the current disclosure can refer to sensor assembly 310 as an Exhaust Gas Recirculation Sensor Assembly ("EGRSA"), and comprises a UEGO sensor for taking oxygen content readings, and an Envirotech humidity sensor which also takes temperature and pressure readings. As shown in FIG. 5, according to some embodiment, sensor assembly 310, is shown as being located downstream from the intercooler 130, and thus is configured to take property readings of mixture 11 after it has been cooled by intercooler 130. However, in other embodiments of the disclosure, sensor assembly 310 is disposed upstream to the intercooler 130 and is configured to take property reading of mixture 11 prior to being cooled by cooler 130. The UEGO sensor of assembly 310 requires a pressure drop in order to make accurate oxygen content readings of mixture 11. To accomplish the pressure drop, sensor assembly 310 is in fluid communication with a pilot air line 311 which is coupled to sensor 310 and mixture chamber 104. Pilot line 311 creates a closed-loop pressure drop within sensor 310, as mixture 11 at the sensor 310 (downstream of compressor 121) is at a higher pressure than mixture 11 at chamber 104 (upstream of compressor 121). Based on the pressure drop created in sensor 310 using pilot air line 311, the UEGO can take accurate oxygen content readings of exhaust-air mixture 11. Transmittance of readings from the sensor assembly 310 to the ECM 400 is represented by dashed arrow 423.

To help drive the recirculated exhaust gas 14, the point at which exhaust gas 13 is pulled for recirculation is disposed downstream from the catalytic converter 191 and upstream to the muffler 192. Exhaust gas 13 pulled at this point enables a small amount of back pressure, which pushes the recirculated exhaust gas 14 towards the EGR cooler 170, in addition to the exhaust gas 13 being cleaner after having passed through the catalytic converter 191.

Figure 6:
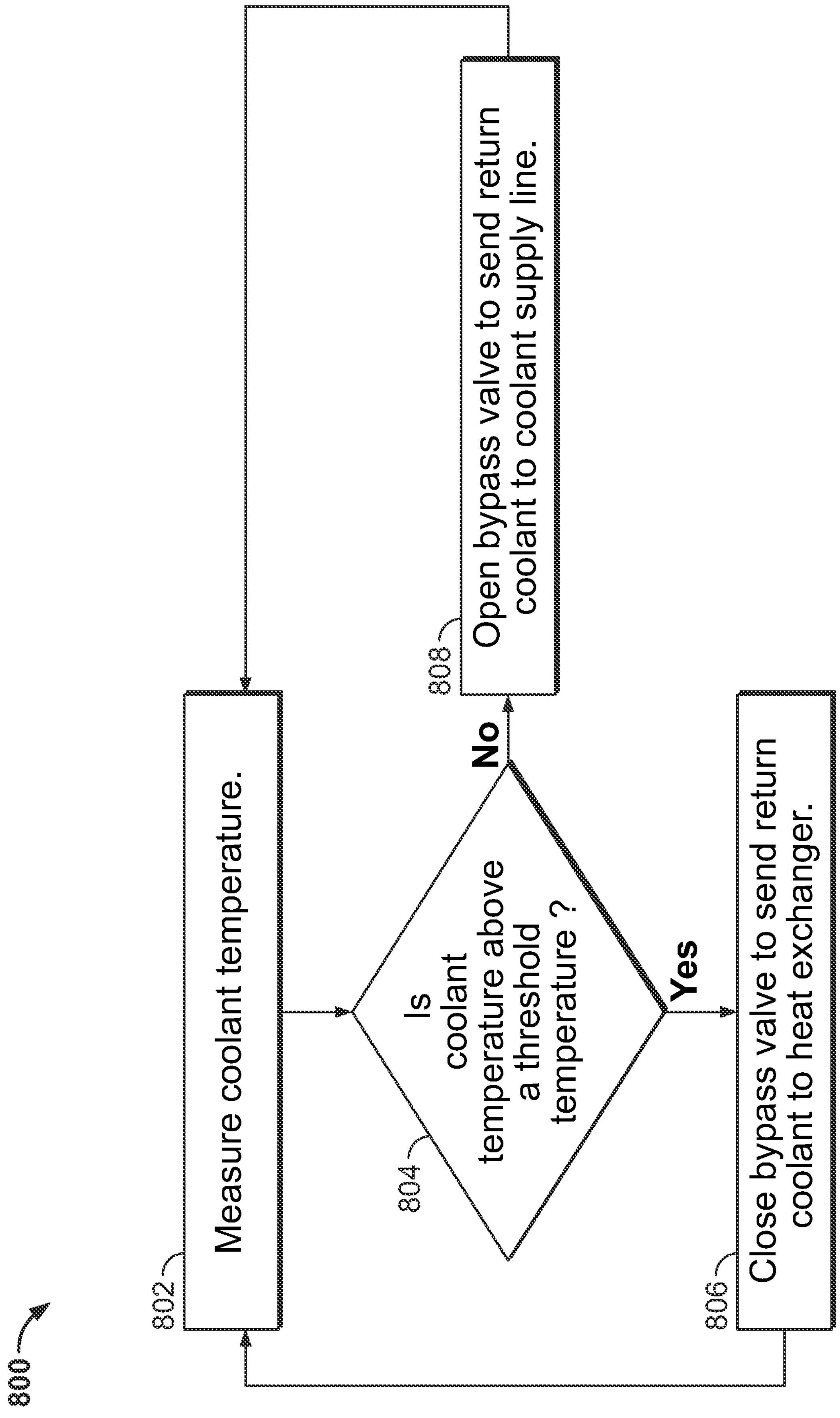
FIG. 6 is a flowchart illustrating a method for operating a heat exchange system of a low-pressure EGR system according to an embodiment of this disclosure.

FIG. 6 is a flowchart illustrating a method 800 for operating heat exchange system 250. Specifically, the method describes operating bypass valve 321 of system 300. However, one with skill in the art will understand that in some embodiments, method 800 is applied for operating bypass valves 224, 223 of systems 100, 200. Method 800 can begin at block 802 by measuring the temperature of the coolant fluid of the heat exchange system. ECM 400 takes temperature readings taken by sensor 323 to measure the temperature of the coolant fluid. The method can continue at block 804, where ECM 400 determines if the measured coolant temperature is above a predetermined threshold temperature. The predetermined threshold temperature can be a temperature at which the coolant is cold enough to be supplied directly to the coolers 130, 170 and does not need to be circulated through heat exchanger 220. The predetermined threshold temperature can be a temperature that is programmed directly to ECM 400 by a user or an operator of the system 300 based on properties of the coolant being used. For example, as previously discussed, the predetermined threshold temperature can be set at 40 degrees Fahrenheit. Additionally, ECM 400 can take into account a tolerance value, such as a tolerance of +/−1.5 degrees Fahrenheit. In response to determining that the coolant temperature is equal to or above the threshold, method 800 continues to block 806 where ECM 400 closes bypass valve 321 to send the coolant of return line 251*a* through heat exchanger 220 to be cooled. In response to determining that the coolant temperature is below the threshold, method 800 continues to block 808 where ECM 400 opens bypass valve 321 to bypass heat exchanger 220 and send coolant from return line 251*a* directly to supply line 251*b*. After opening or closing bypass valve 321 in blocks 806 and 808, method 800 can continue back to block 802 to measure coolant fluid temperature such that method 800 can be continually operated during operation of system 300.

One with skill in the art will understand how method 800 can be used anytime during operation of system 300. For example, method 800 can be performed during the start-up of engine 160. Start-up of engine 160 typically occurs after engine 160 has sat idle for a period of time, and thus, based on environmental factors, the coolant of system 250 may have been given time to cool to a point where it does not need to be sent though heat exchanger 220 before being sent to coolers 130, 170. Accordingly, method 800 can be utilized during engine 160 start-up to determine if the coolant needs to be cooled or if it is already cool enough to be delivered to coolers 130, 170.

Figure 7:
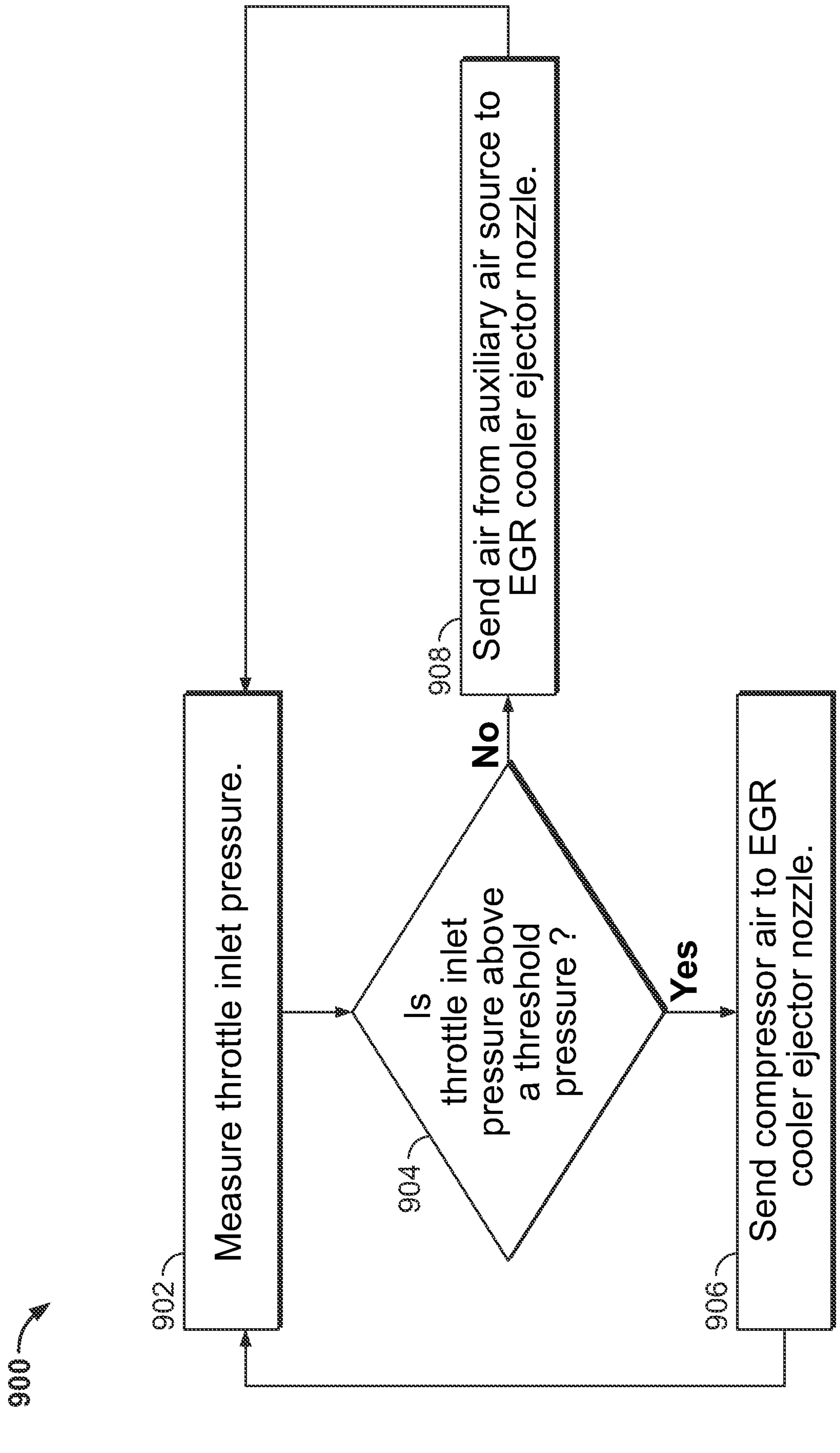
FIG. 7 is a flowchart illustrating a method for operating a condensate ejection system according to an embodiment of this disclosure.

FIG. 7 is a flowchart illustrating a method 900 for delivering air to ejector nozzle 225 using system 700. Method 900 can begin at block 902 by measuring the throttle inlet pressure. ECM 400 can measure the throttle inlet pressure by using pressure readings taken from TTIP 602. The throttle inlet pressure depends on the operation of compressor 121. Method 900 can continue at block 904, where ECM 400 determines whether the throttle inlet pressure is above a predetermined threshold pressure. The predetermined threshold pressure can be a minimum pressure that indicates compressor 121 is operational for supplying air to nozzle 225 and can programmed into ECM 400 by an operator or user based on operating properties of compressor 121. In response to determining that the throttle inlet pressure is above the predetermined threshold value, method 900 can continue to block 906 by sending air from the compressor to ejector nozzle 225. ECM 400 opens valve 240 such that air from compressor 121 is delivered to nozzle 225. In response to determining that the throttle inlet pressure is below the predetermined threshold value, method 900 can continue to block 908 by sending air from an auxiliary air source to ejector nozzle 225. For example, the auxiliary air source can be brake system 228. ECM 400 opens valve 241 so that air from brake system 228 is delivered to nozzle 225. After air is delivered to nozzle 225 in blocks 906, 908, method 900 can continue back to block 902 to ensure air is constantly supplied to nozzle 225.

One with skill in the art will recognize that method 900 can be performed anytime during operation of systems 100, 200, 300. In preferred embodiments, air is constantly delivered to nozzle 225 while system 100, 200, 300 is in operation to constantly assist in pulling condensate liquid out of cooler 170. Ideally, the air supply to nozzle 225 would always come from compressor 121. However, during certain times, such as during start-up of engine 160, there may be a brief period of time where compressor 121 is not up to proper operational speed for supplying air to engine 160 or nozzle 225. Accordingly, method 900 can be utilized to ensure nozzle 225 is supplied air by brake system 228 during times when compressor 121 is not yet delivering proper operational outputs, such as during engine 160 start-up.

Figure 8:
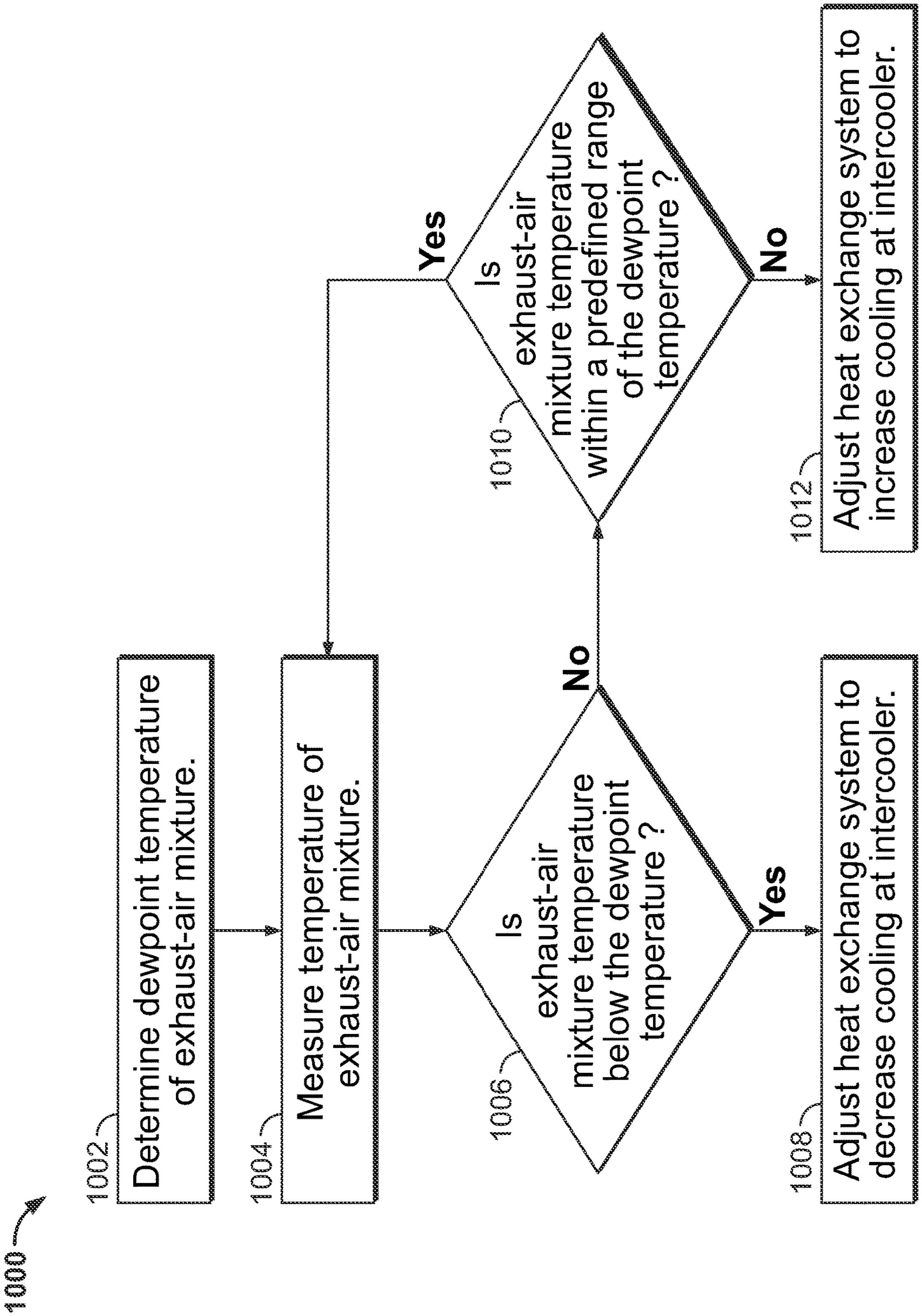
FIG. 8 is a flowchart illustrating a method for supplying a fluid coolant to an intercooler of an EGR system according to an embodiment of this disclosure.

FIG. 8 is a flowchart illustrating a method 1000 of supplying coolant to coolers 130, 170. Method 1000 can start at block 1002 by ECM 400 determining a dewpoint temperature of exhaust-air mixture 11. One with skill in the art will recognize that the dewpoint temperature of exhaust-air mixture 11 is the temperature at which exhaust-air mixture 11 would have to be cooled to (at a constant pressure) in order to reach saturation. ECM 400 calculates the estimated dewpoint temperature of exhaust-air mixture 11 based on temperature, pressure, humidity, and oxygen content readings from EGRSA 310. In some embodiments, ECM 400 adds a safety factor to the determined dewpoint to ensure that mixture 11 does not go below the actual dewpoint temperature, which could cause moisture to form in the intercooler 130. For example, in some embodiments, ECM 400 incorporates a safety factor of 1.5 degrees Fahrenheit when calculating the estimated dewpoint temperature of mixture 11.

Method 1000 can continue at block 1004 by ECM 400 determining the actual temperature of exhaust-air mixture 11. ECM 400 uses temperature readings measured by TTIP 602 to determine the actual temperature of exhaust-air mixture 11. The temperature of mixture 11 is measured downstream of intercooler 130 so that ECM 400 can determine to what temperature intercooler 130 is cooling mixture 11 relative to the dewpoint temperature of mixture 11. Method 1000 can continue at block 1006 by ECM 400 determining whether the measured temperature of mixture 11, which has been cooled by intercooler 130, is below the estimated dewpoint temperature of mixture 11. In response to determining that the measured temperature of mixture 11 is below the estimated dewpoint temperature of mixture 11, method 1000 can continue at block 1008 by making adjustments to heat exchange system 131, 171, 250 to decrease the rate of cooling performed by intercooler 130. In some embodiments, block 1008 comprises ECM 400 adjusting split valve 322 such that the amount of coolant supplied to intercooler 130 in supply line **251*b* is decreased. Due to the inherent properties of split valve 322 and coolant system 250, the decrease in coolant supply to intercooler 130 will, in turn, increase the coolant supply to EGR cooler 170. ECM 400 decreases the coolant flow to intercooler 130 so that the temperature of mixture 11 cooled by intercooler 130 can rise above the dewpoint temperature. In some embodiments block 1008 comprises ECM 400 opening bypass valve 321 so that coolant of return line 251*a* can bypass heat exchanger 220 be supplied directly to supply line 251*b*, which decreases the rate of cooling performed at intercooler 130**.

In response to determining that the measured temperature of mixture 11 is above the determined dewpoint temperature of mixture 11 at block 1006, method 1000 can continue at block 1010 where ECM 400 then determines if the measured temperature of mixture 11 is within a predefined range of the determined dewpoint. For example, in some embodiments, the predetermined range is a temperature within 1.5 degrees Fahrenheit above the determined dewpoint temperature. In response to determining that the measured temperature is within the predetermined range, method 1000 can continue back to block 1004 by measuring the temperature of the of mixture 11. In response to determining that the measured temperature is outside of the predetermined range, method 1000 can continue to block 1012 by making adjustments to heat exchange system 131, 171, 250 to increase the rate of cooling performed at intercooler 130. In some embodiment, block 1012 comprises ECM 400 adjusting split valve 322 such that the amount of coolant supplied to intercooler 130 in supply line **251*b* is increased. Due to the inherent properties of split valve 322 and coolant system 250, the increase in coolant supply to intercooler 130 will, in turn, decrease the coolant supply to EGR cooler 170. ECM 400 increases the coolant flow to intercooler 130 so that the temperature of mixture 11 can decrease to within the predefined range of the determined dewpoint temperature of mixture 11. In some embodiments, where bypass valve 321 is in an open position, block 1012 comprises ECM 400 closing bypass valve 321 so that all fluid from return line 251*a* is cooled by heat exchanger 220**.

As previously discussed, lowering the temperature of mixture 11 prior to entering engine 160 is desirable in increasing the oxygen content of mixture 11. However, it is undesirable to lower the temperature of mixture 11 to below the dewpoint, as doing so produces moisture, and any moisture allowed to enter engine 160 can cause undesirable side effects, such as inefficiency and knocking. Accordingly, method 1000 can be utilized by systems 100, 200, 300 to ensure that intercooler 130 cools mixture 11 to a cold as possible without also causing mixture 11 to saturate. Accordingly, system 100, 200, 300 offers improvements over the prior art, as intercooler 130 does not require an associated moisture removal system, such as a heater or a liquid-gas separator. Instead, system 100, 200, 300 incorporates EGR cooler 170, which is supplied as much coolant fluid as possible (by use of split valve 322) so that EGR cooler 170 can cool exhaust gas 14 as much as possible (short of freezing exhaust gas 14) so that all moisture of is removed from exhaust 14 at EGR cooler 170 via condensation drain 176 and condensate system 700, upstream of intercooler 130.

Figure 9:
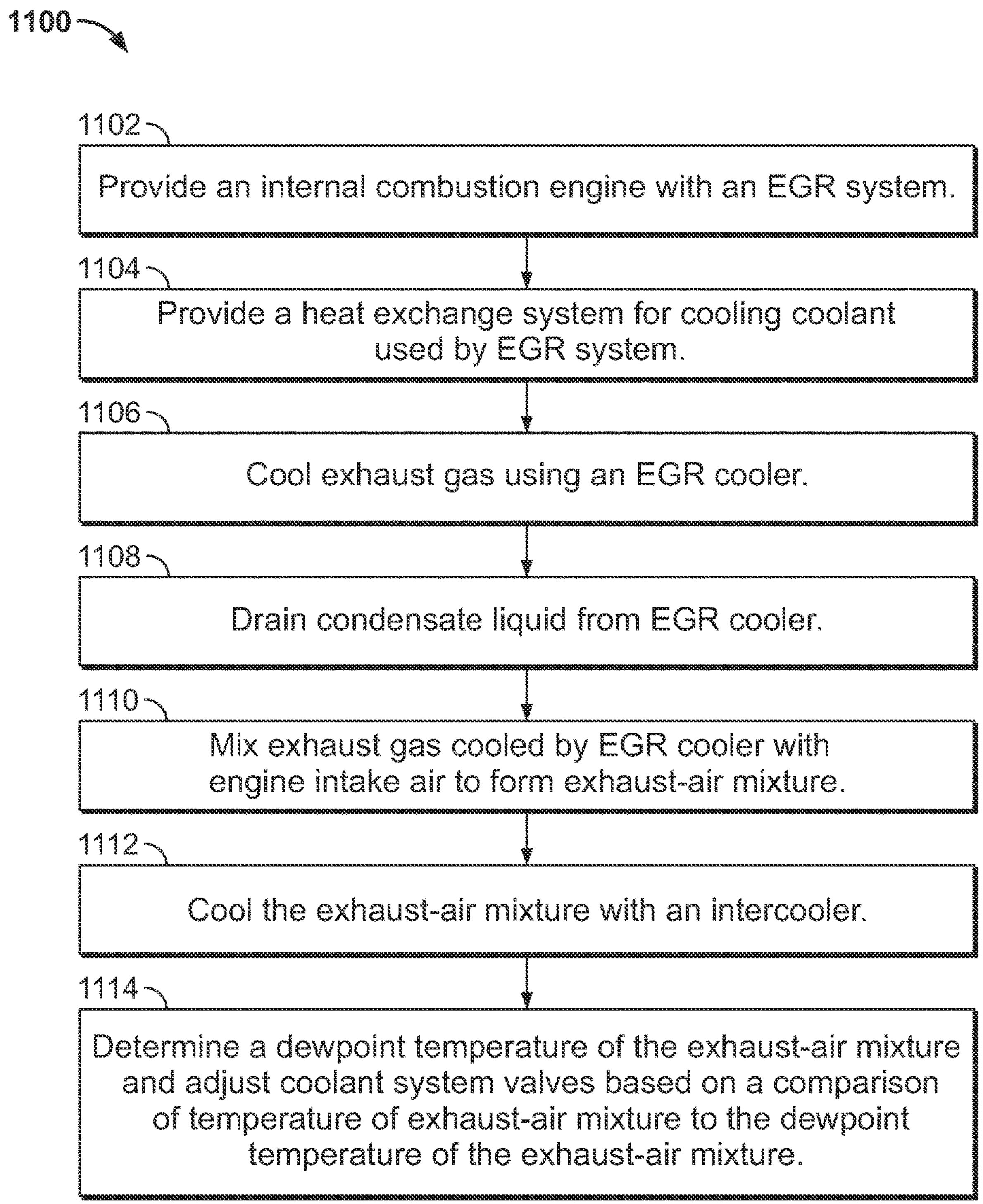
FIG. 9 is a flowchart illustrating a method of circulating exhaust gas through an EGR system according to an embodiment of this disclosure.

FIG. 9 illustrates a method 1100 of circulating exhaust gas 13 taken from exhaust system 105 to air intake system 102. Method 1100 can begin at block 1102 by providing internal combustion engine 160 with an exhaust gas recirculation system 100, 200, 300. Method 1100 can continue at block 1104 by providing a heat exchange system 131, 171, 250 for cooling coolant used by coolers 130, 170 of the EGR system 100, 200, 300. Method 1100 can continue at block 1106 by cooling exhaust gas 14 with EGR cooler 170. Method 1100 can continue at block 1108 by draining exhaust condensate liquid formed in EGR 170 using condensate exhaust drain 176. One with skill in the art will recognize that ejection system 700 and method 900 can be incorporated to block 1108 in draining the condensate liquid. Method 1100 can continue at block 1110 by mixing exhaust gas 14 cooled by EGR cooler 170 with intake air 10 at mixing chamber 104 to form exhaust-air mixture 11. Method 1100 can continue at block 1112 by cooling mixture 11 with intercooler 130. Method 1100 can continue at block 1114 by adjusting coolant supplied to intercooler 130 and EGR cooler 170 based on comparing a temperature of mixture 11 to a dewpoint temperature of mixture 11. One with skill in the art will recognize that method 1000 can be incorporated at block 1114.

Other Alternatives

Although the present disclosure has been described in terms of the foregoing embodiments, this description has been provided by way of explanation only and is not intended to be construed as a limitation of the invention. Indeed, even though the foregoing descriptions refer to numerous components and other embodiments that are presently contemplated, those of ordinary skill in the art will recognize many possible alternatives that have not been expressly referenced or even suggested here. For example, while the foregoing description is presented in the context of low-pressure EGR where the benefits can be most appreciated, many aspects of the invention can also be appreciated through implementation of comparable systems in high pressure EGR arrangements. Therefore, while the foregoing written descriptions should enable one of ordinary skill in the pertinent arts to make and use what are presently considered the best modes of the invention, those of ordinary skill will also understand and appreciate the existence of numerous variations, combinations, and equivalents of the various aspects of the specific embodiments, methods, and examples referenced herein.

Hence the drawings and detailed descriptions herein should be considered illustrative, not exhaustive. They do not limit the invention to the particular forms and examples disclosed. To the contrary, the invention includes many further modifications, changes, rearrangements, substitutions, alternatives, design choices, and embodiments apparent to those of ordinary skill in the art, without departing from the spirit and scope of this invention.

Accordingly, in all respects, it should be understood that the drawings and detailed descriptions herein are to be regarded in an illustrative rather than a restrictive manner and are not intended to limit the invention to the particular forms and examples disclosed. In any case, all substantially equivalent systems, articles, and methods should be considered within the scope of the invention and, absent express indication otherwise, all structural or functional equivalents are anticipated to remain within the spirit and scope of the presently disclosed systems and methods.

What is claimed is:

1. An exhaust gas recirculation (EGR) system for use in an internal combustion engine system, where the internal combustion engine system comprises an air intake system and an exhaust system, the EGR system comprising:

a first cooler in communication with the exhaust system and configured to cool exhaust gas from the exhaust system using a coolant fluid, the first cooler comprising a first coolant fluid inlet configured to accept the coolant fluid and a first coolant fluid outlet configured to discharge the coolant fluid;

a mixture chamber in communication with the first cooler and the air intake system, wherein exhaust gas cooled by the first cooler is mixed with intake air in the mixture chamber to form an exhaust-air mixture;

a second cooler configured to receive exhaust-air mixture from the mixture chamber and cool the exhaust-air mixture using the coolant fluid, the second cooler comprising a second coolant fluid inlet configured to accept the coolant fluid and a second coolant fluid outlet configured to discharge the coolant fluid;

a sensor assembly disposed and configured to gather readings of properties of the exhaust-air mixture, wherein the properties include at least some of pressure, temperature, humidity, and oxygen content;

a heat exchange system configured to circulate and cool the coolant fluid used by the first cooler and the second cooler using at least one coolant fluid pump and at least one heat exchanger and control at least one of a coolant fluid temperature and a coolant fluid amount of the coolant fluid supplied to the second coolant inlet;

an engine control module (ECM) configured to:

calculate a dewpoint temperature of the exhaust-air mixture based on readings from the sensor assembly, determine a temperature of the exhaust-air mixture using readings from a throttle inlet sensor associated with the internal combustion engine system, compare the temperature of the exhaust-air mixture to the dewpoint temperature, and control the heat exchange system to adjust at least one of the coolant fluid temperature and the coolant fluid amount of the coolant fluid supplied to the second coolant inlet based on the comparison.

2. The EGR system of claim 1, wherein the heat exchange system further comprises:

a coolant supply line in fluid communication with, and configured to supply the coolant fluid to, the first coolant inlet and the second coolant inlet;

a coolant return line in fluid communication with, and configured to accept the discharged coolant fluid from, the first coolant outlet and the second coolant outlet; and a split valve configured to divide coolant fluid flow between the first and second coolers, wherein the at least one heat exchanger is configured to cool the coolant fluid from the coolant return line and deliver the cooled coolant fluid to the coolant supply line.

3. The EGR system of claim 2, wherein, in the controlling of the heat exchange system, the ECM is further configured to:

in response to comparing the temperature of the exhaust-air mixture to the dewpoint temperature and determining that the temperature of the exhaust-air mixture is below the dewpoint temperature, adjust the split valve to decrease the amount of coolant fluid delivered to the second coolant inlet; and in response to comparing the temperature of the exhaust-air mixture to the dewpoint temperature and determining that the temperature of the exhaust-air mixture is above the dewpoint temperature by more than a predetermined range, adjust the split valve to increase the amount of coolant fluid delivered to the second coolant inlet.

4. The EGR system of claim 1, wherein:

the first cooler is further configured to liquefy at least part of the exhaust gas to form an exhaust liquid;

the first cooler further comprises a condensation drain configured to drain any exhaust liquid from the first cooler; and all condensate management of the system is performed at the first cooler by liquifying the exhaust gas to the exhaust liquid and draining the exhaust liquid.

5. The EGR system of claim 2, wherein:

the heat exchange system further comprises a heat exchanger bypass valve;

in response to the heat exchanger bypass valve being in an open position, the coolant return line is configured to be in direct fluid communication with the coolant supply line such that coolant fluid bypasses the heat exchanger and flows directly from the coolant return line to the coolant supply line; and in the controlling of the heat exchange system, the ECM is further configured to open the heat exchanger bypass valve in response to comparing the temperature of the exhaust-air mixture to the dewpoint temperature and determining that the temperature of the exhaust-air mixture is below the dewpoint temperature.

6. The EGR system of claim 5, wherein:

the heat exchange system further comprises a coolant temperature sensor configured to take temperature readings of the coolant fluid; and the ECM is configured to:

determine a temperature of the coolant fluid using the temperature readings from the coolant temperature sensor, compare the temperature of the coolant fluid to a predetermined coolant temperature threshold, and in response to determining based on the comparison that the temperature of the coolant fluid is below the coolant temperature threshold, open the heat exchanger bypass valve.

7. The EGR system of claim 4, further comprising a condensate ejection system in fluid communication with the condensate drain, the condensation ejection system comprising a nozzle configured to assist in the draining of the exhaust liquid from the condensate drain using pressurized air, wherein:

the nozzle is in fluid communication with a compressor associated with the intake system and a brake system of a vehicle powered by the internal combustion engine system, and the pressurized air is configured to be delivered to the nozzle by one of the compressor and the brake system.

8. The EGR system of claim 7, wherein the ECM is further configured to:

determine a throttle inlet pressure of the internal combustion engine system using readings from a throttle inlet pressure sensor; and in response to determining that the throttle inlet pressure is below a predetermined threshold, deliver pressurized air from the brake system to the nozzle by opening a brake air valve of the condensate ejection system.

9. A method of circulating engine exhaust gas from an exhaust system of an internal combustion engine to an intake system of the internal combustion engine, the method comprising:

cooling exhaust gas from the exhaust system with a first cooler, the first cooler configured to cool exhaust gas from the exhaust system using a coolant fluid, the first cooler comprising a first coolant fluid inlet configured to accept the coolant fluid and a first coolant fluid outlet configured to discharge the coolant fluid;

mixing the exhaust gas cooled by the first cooler with engine intake air from the intake system in a mixing chamber to form an exhaust-air mixture;

cooling the exhaust-air mixture with a second cooler configured to cool the exhaust-air mixture using the coolant fluid, the second cooler comprising a second coolant fluid inlet configured to accept the coolant fluid and a second coolant fluid outlet configured to discharge the coolant fluid;

circulating and cooling the coolant fluid used by the first cooler and the second cooler through a heat exchange system using at least one coolant fluid pump and at least one heat exchanger;

calculating, using an engine control module (ECM), a dewpoint temperature of the exhaust-air mixture based on readings taken from a sensor assembly;

determining, using the ECM, a temperature of the exhaust-air mixture using readings from a throttle inlet sensor associated with the internal combustion engine system;

comparing, using the ECM, a temperature of the exhaust-air mixture measured by the sensor assembly to the dewpoint temperature; and controlling the heat exchange system, using the ECM, to adjust at least one of a coolant fluid temperature and a coolant fluid amount of the coolant fluid supplied to the second coolant inlet based on the comparison.

10. The method of claim 9, wherein the heat exchange system further comprises:

a coolant supply line in fluid communication with, and configured to supply to coolant fluid to, the first coolant inlet and the second coolant inlet;

a coolant return line in fluid communication with, and configured to accept the discharged coolant fluid from, the first coolant outlet and the second coolant outlet; and a split valve configured to divide coolant fluid flow between the first and second coolers, wherein the at least one heat exchanger is configured to cool fluid from the coolant return line and deliver the cooled coolant fluid to the coolant supply line.

11. The method of claim 10, wherein the controlling the heat exchange system by the ECM further comprises:

in response to comparing the temperature of the exhaust-air mixture to the dewpoint temperature and determining that the temperature of the exhaust-air mixture is below the dewpoint temperature, adjusting the split valve, using the ECM, to decrease the amount of coolant fluid delivered to the second coolant inlet; and in response to comparing the temperature of the exhaust-air mixture to the dewpoint temperature and determining that the temperature of the exhaust-air mixture is above the dewpoint temperature by more than a predetermined range, adjusting the split valve, using the ECM, to increase the amount of coolant delivered to the second coolant inlet.

12. The method of claim 10, wherein:

the heat exchange system further comprises a heat exchanger bypass valve;

in response to the heat exchanger bypass valve being in an open position, the coolant return line is configured to be in direct fluid communication with the coolant supply line such that coolant fluid bypasses the heat exchanger and flows directly from the coolant return line to the coolant supply line; and in response to comparing the temperature of the exhaust-air mixture to the dewpoint temperature and determining that the temperature of the exhaust-air mixture is below the dewpoint temperature, opening the bypass valve, using the ECM, to increase the temperature of coolant fluid delivered to the second coolant inlet.

13. The method of claim 12, further comprising:

determining, by the ECM, a temperature of the coolant fluid using temperature reading from a coolant temperature sensor;

comparing, by the ECM, the temperature of the coolant fluid to a predetermined coolant temperature threshold; and in response to determining based on the comparison that the temperature of the coolant fluid is below the coolant temperature threshold, opening, by the ECM, the heat exchanger bypass valve.

14. The method of claim 9, wherein:

the first cooler is further configured to liquify at least part of the exhaust gas to form an exhaust liquid;

the first cooler further comprises a condensation drain configured to drain any exhaust liquid from the first cooler;

the condensation drain is in fluid communication with a condensate ejection system, the condensation ejection system comprising a nozzle configured to assist in draining of exhaust liquid from the condensate drain using pressurized air;

the nozzle is in fluid communication with a compressor associated with the intake system and a brake system of a vehicle powered by the internal combustion engine system;

the pressurized air is configured to be delivered to the nozzle by one of the compressor or the brake system; and the method further comprises draining exhaust liquid from the first cooler using the condensation drain and the condensate ejection system.

15. The method of claim 14, further comprising:

determining, by the ECM, a throttle inlet pressure of the internal combustion engine system using readings from a throttle inlet pressure sensor; and in response to determining that the throttle inlet pressure is below a predetermined threshold, delivering pressurized air from the brake system to the nozzle by opening, by the ECM, a brake air valve of the condensate ejection system.

* * * * *